(12) United States Patent
Cao

(10) Patent No.: US 11,074,385 B2
(45) Date of Patent: Jul. 27, 2021

(54) METHOD AND SYSTEM FOR HIERARCHICAL CIRCUIT SIMULATION USING PARALLEL PROCESSING

(71) Applicant: ICEE Solutions LLC, Cupertino, CA (US)

(72) Inventor: Henry Hongwei Cao, Cupertino, CA (US)

(73) Assignee: ICEE Solutions LLC, Cupertino, CA (US)

(*) Notice: Subject to any disclaimer, the term of this patent is extended or adjusted under 35 U.S.C. 154(b) by 214 days.

(21) Appl. No.: 16/428,703

(22) Filed: May 31, 2019

(65) Prior Publication Data
US 2019/0370426 A1 Dec. 5, 2019

Related U.S. Application Data

(60) Provisional application No. 62/679,645, filed on Jun. 1, 2018.

(51) Int. Cl.
| | |
|---|---|
| *G06F 30/367* | (2020.01) |
| *G06F 30/327* | (2020.01) |
| *G06F 40/137* | (2020.01) |
| *G06F 111/02* | (2020.01) |
| *G06F 115/10* | (2020.01) |

(52) U.S. Cl.
CPC .......... *G06F 30/367* (2020.01); *G06F 30/327* (2020.01); *G06F 40/137* (2020.01); *G06F 2111/02* (2020.01); *G06F 2115/10* (2020.01)

(58) Field of Classification Search
CPC ... G06F 30/367; G06F 40/137; G06F 2115/10
USPC .......................................................... 716/106
See application file for complete search history.

(56) References Cited

U.S. PATENT DOCUMENTS

| | | | |
|---|---|---|---|
| 6,577,992 B1* | 6/2003 | Tcherniaev | G06F 30/367 |
| | | | 703/14 |
| 7,555,733 B1* | 6/2009 | Gee | G06F 30/367 |
| | | | 716/106 |
| 8,694,302 B1 | 4/2014 | Ho | |

(Continued)

OTHER PUBLICATIONS

ICEE Solutions LLC, PCT International Search Report, PCT/US2019/035013, Aug. 22, 2019, 2 pgs.

(Continued)

*Primary Examiner* — Suchin Parihar

(57) ABSTRACT

A method for simulating a hierarchical circuit includes a bottom-up process and a top-down process in each of a series of iteration rounds. The bottom-up process starts from a bottom level of the hierarchical circuit and obtains submatrices and subvectors for each subcircuit instance (SCI) in the hierarchical circuit. For each SCI, after obtaining first and second submatrices and first and second subvectors of the each SCI, the second submatrix and the second subvector are passed up to the next level in the hierarchy and used to calculate the circuit equation for a parent SCI in the next level. In the top-down process, starting at a top circuit, signal values in each level of the hierarchical circuit are determined. Certain signal values of a parent SCI are passed down to each child SCI, and are used to determine the internal signal values of the child SCI together with the first submatrix and the first subvector of the child SCI.

20 Claims, 21 Drawing Sheets

(56) References Cited

U.S. PATENT DOCUMENTS

| | | | |
|---|---|---|---|
| 10,198,543 B2* | 2/2019 | Knapp | G06F 30/327 |
| 10,783,292 B1* | 9/2020 | Clewes | G06F 30/327 |
| 2006/0101358 A1* | 5/2006 | Shah | G06F 30/33 |
| | | | 716/103 |
| 2006/0161413 A1* | 7/2006 | Wei | G06F 30/33 |
| | | | 703/14 |
| 2007/0157135 A1 | 7/2007 | Yang | |
| 2013/0191805 A1* | 7/2013 | Lin | G06F 30/20 |
| | | | 716/136 |
| 2019/0370426 A1* | 12/2019 | Cao | G06F 30/327 |

OTHER PUBLICATIONS

ICEE Solutions LLC, PCT Written Opinion, PCT/US2019/035013, Aug. 22, 2019, 5 pgs.

* cited by examiner

```
.subckt SCI_11 a b out VDD GND
......
.ends

.subckt SCI_12 in out VDD GND
......
.ends

.subckt SCI_1 a b out VDD GND
x1 a b n2 VDD GND SCI_11
x2 n2 out VDD GND SCI_12
.ends .subckt top in out VDD GND
r1 in n1 100k
c1 n1 GND 100f
x1 n1 GND out VDD GND SCI_1
x2 VDD GND SCI_2
.ends vin in GND dc 0 pulse (0 2.5 53.4n 0.1n 0.1n 53.4n 107n)

.OPTION CONVERGE=1 GMINDC=1.0000E-11...

.tran 0.01ns 120000.0ns

.SAVE ALL
.plot tran v(in) v(n1) v(out)
```

Figure 6A

Column Order: n1, n2, VDD, GND, ..., SCI_11

Row Order:

$$
\begin{pmatrix}
Ge_{11}^{[11]} & Ge_{11}^{[12]} & Ge_{11}^{[13]} & Ge_{11}^{[14]} & Gei_{11}^{[11]} \\
Ge_{11}^{[21]} & Ge_{11}^{[22]} & Ge_{11}^{[23]} & Ge_{11}^{[24]} & Gei_{11}^{[21]} \\
Ge_{11}^{[31]} & Ge_{11}^{[32]} & Ge_{11}^{[33]} & Ge_{11}^{[34]} & Gei_{11}^{[31]} \\
Ge_{11}^{[41]} & Ge_{11}^{[42]} & Ge_{11}^{[43]} & Ge_{11}^{[44]} & Gei_{11}^{[41]} \\
Gie_{11}^{[11]} & Gie_{11}^{[12]} & Gie_{11}^{[13]} & Gie_{11}^{[14]} & Gi_{11}^{[11]}
\end{pmatrix}
\times
\begin{pmatrix}
Ve_{11}^{[1]} \\
Ve_{11}^{[2]} \\
Ve_{11}^{[3]} \\
Ve_{11}^{[4]} \\
Vi_{11}^{[1]}
\end{pmatrix}
=
\begin{pmatrix}
Ie_{11}^{[1]} \\
Ie_{11}^{[2]} \\
Ie_{11}^{[3]} \\
Ie_{11}^{[4]} \\
Ii_{11}^{[1]}
\end{pmatrix}
$$

Rows: n1, n2, VDD, GND, ...

Figure 6B

Column Order: n1, n2, VDD, GND, ..., SCI_11

Row Order:

$$
\begin{pmatrix}
Ge'_{11}{}^{[11]} & Ge'_{11}{}^{[12]} & Ge'_{11}{}^{[13]} & Ge'_{11}{}^{[14]} & 0 \\
Ge'_{11}{}^{[21]} & Ge'_{11}{}^{[22]} & Ge'_{11}{}^{[23]} & Ge'_{11}{}^{[24]} & 0 \\
Ge'_{11}{}^{[31]} & Ge'_{11}{}^{[32]} & Ge'_{11}{}^{[33]} & Ge'_{11}{}^{[34]} & 0 \\
Ge'_{11}{}^{[41]} & Ge'_{11}{}^{[42]} & Ge'_{11}{}^{[43]} & Ge'_{11}{}^{[44]} & 0 \\
Gie'_{11}{}^{[11]} & Gie'_{11}{}^{[12]} & Gie'_{11}{}^{[13]} & Gie'_{11}{}^{[14]} & 1
\end{pmatrix}
\times
\begin{pmatrix}
Ve_{11}^{[1]} \\
Ve_{11}^{[2]} \\
Ve_{11}^{[3]} \\
Ve_{11}^{[4]} \\
Vi_{11}^{[1]}
\end{pmatrix}
=
\begin{pmatrix}
Ie'_{11}{}^{[1]} \\
Ie'_{11}{}^{[2]} \\
Ie'_{11}{}^{[3]} \\
Ie'_{11}{}^{[4]} \\
Ii'_{11}{}^{[1]}
\end{pmatrix}
$$

Rows: n1, n2, VDD, GND, ...

Figure 6C

Column Order: n2, out, VDD, GND, ..., SCI_12

Row Order:

| | n2 | out | VDD | GND | | | |
|---|---|---|---|---|---|---|---|
| n2 | $Ge_{12}^{[11]}$ | $Ge_{12}^{[12]}$ | $Ge_{12}^{[13]}$ | $Ge_{12}^{[14]}$ | $Gei_{12}^{[11]}$ | | |
| out | $Ge_{12}^{[21]}$ | $Ge_{12}^{[22]}$ | $Ge_{12}^{[23]}$ | $Ge_{12}^{[24]}$ | $Gei_{12}^{[21]}$ | | |
| VDD | $Ge_{12}^{[31]}$ | $Ge_{12}^{[32]}$ | $Ge_{12}^{[33]}$ | $Ge_{12}^{[34]}$ | $Gei_{12}^{[31]}$ | | |
| GND | $Ge_{12}^{[41]}$ | $Ge_{12}^{[42]}$ | $Ge_{12}^{[43]}$ | $Ge_{12}^{[44]}$ | $Gei_{12}^{[41]}$ | | |
| ... | $Gie_{12}^{[11]}$ | $Gie_{12}^{[12]}$ | $Gie_{12}^{[13]}$ | $Gie_{12}^{[14]}$ | $Gi_{12}^{[11]}$ | | |

$\times \begin{bmatrix} Ve_{12}^{[1]} \\ Ve_{12}^{[2]} \\ Ve_{12}^{[3]} \\ Ve_{12}^{[4]} \\ Vi_{12}^{[1]} \end{bmatrix} = \begin{bmatrix} Ie_{12}^{[1]} \\ Ie_{12}^{[2]} \\ Ie_{12}^{[3]} \\ Ie_{12}^{[4]} \\ Ii_{12}^{[1]} \end{bmatrix}$

Figure 6D

Column Order: n2, out, VDD, GND, ..., SCI_12

Row Order:

| | n2 | out | VDD | GND | | | |
|---|---|---|---|---|---|---|---|
| n2 | $Ge'_{12}^{[11]}$ | $Ge'_{12}^{[12]}$ | $Ge'_{12}^{[13]}$ | $Ge'_{12}^{[14]}$ | 0 | | |
| out | $Ge'_{12}^{[21]}$ | $Ge'_{12}^{[22]}$ | $Ge'_{12}^{[23]}$ | $Ge'_{12}^{[24]}$ | 0 | | |
| VDD | $Ge'_{12}^{[31]}$ | $Ge'_{12}^{[32]}$ | $Ge'_{12}^{[33]}$ | $Ge'_{12}^{[34]}$ | 0 | | |
| GND | $Ge'_{12}^{[41]}$ | $Ge'_{12}^{[42]}$ | $Ge'_{12}^{[43]}$ | $Ge'_{12}^{[44]}$ | 0 | | |
| ... | $Gie'_{12}^{[11]}$ | $Gie'_{12}^{[12]}$ | $Gie'_{12}^{[13]}$ | $Gie'_{12}^{[14]}$ | 1 | | |

$\times \begin{bmatrix} Ve_{12}^{[1]} \\ Ve_{12}^{[2]} \\ Ve_{12}^{[3]} \\ Ve_{12}^{[4]} \\ Vi_{12}^{[1]} \end{bmatrix} = \begin{bmatrix} Ie'_{12}^{[1]} \\ Ie'_{12}^{[2]} \\ Ie'_{12}^{[3]} \\ Ie'_{12}^{[4]} \\ Ii'_{12}^{[1]} \end{bmatrix}$

Figure 6E

Column Order 612

614 Row Order

Column headers: n1　out　VDD　GND　|　n2　　　　　SCI_1

$$\begin{pmatrix} Ge_1^{[11]} & Ge_1^{[12]} & Ge_1^{[13]} & Ge_1^{[14]} & Gei_1^{[11]} \\ Ge_1^{[21]} & Ge_1^{[22]} & Ge_1^{[23]} & Ge_1^{[24]} & Gei_1^{[21]} \\ Ge_1^{[31]} & Ge_1^{[32]} & Ge_1^{[33]} & Ge_1^{[34]} & Gei_1^{[31]} \\ Ge_1^{[41]} & Ge_1^{[42]} & Ge_1^{[43]} & \underline{Ge_1^{[44]}} & Gei_1^{[41]} \\ Gie_1^{[11]} & Gie_1^{[12]} & Gie_1^{[13]} & Gie_1^{[14]} & Gi_1^{[11]} \end{pmatrix} \times \begin{pmatrix} Ve_1^{[1]} \\ Ve_1^{[2]} \\ Ve_1^{[3]} \\ Ve_1^{[4]} \\ Vi_1^{[1]} \end{pmatrix} = \begin{pmatrix} Ie_1^{[1]} \\ Ie_1^{[2]} \\ Ie_1^{[3]} \\ Ie_1^{[4]} \\ Ii_1^{[1]} \end{pmatrix}$$

Row Order labels: n1, out, VDD, GND, n2

Figure 6F

Column Order: n1　out　VDD　GND　|　n2　　　　　SCI_1

Row Order: n1, out, VDD, GND, n2

(Same matrix as Figure 6E)

Bold, to add SCI_11 $Ge'_{11}$ $Ie'_{11}$ of Figure 6B 652　654　656　658　　　　　660

Column Order: n1　n2　VDD　GND　...　　　　　SCI_11

Row Order: n1, n2, VDD, GND, ...

$$\begin{pmatrix} Ge'_{11}^{[11]} & Ge'_{11}^{[12]} & Ge'_{11}^{[13]} & Ge'_{11}^{[14]} & 0 \\ Ge'_{11}^{[21]} & Ge'_{11}^{[22]} & Ge'_{11}^{[23]} & Ge'_{11}^{[24]} & 0 \\ Ge'_{11}^{[31]} & Ge'_{11}^{[32]} & Ge'_{11}^{[33]} & Ge'_{11}^{[34]} & 0 \\ Ge'_{11}^{[41]} & Ge'_{11}^{[42]} & Ge'_{11}^{[43]} & Ge'_{11}^{[44]} & 0 \\ Gie'_{11}^{[11]} & Gie'_{11}^{[12]} & Gie'_{11}^{[13]} & Gie'_{11}^{[14]} & 1 \end{pmatrix} \times \begin{pmatrix} Ve_{11}^{[1]} \\ Ve_{11}^{[2]} \\ Ve_{11}^{[3]} \\ Ve_{11}^{[4]} \\ Vi_{11}^{[1]} \end{pmatrix} = \begin{pmatrix} Ie'_{11}^{[1]} \\ Ie'_{11}^{[2]} \\ Ie'_{11}^{[3]} \\ Ie'_{11}^{[4]} \\ Ii'_{11}^{[1]} \end{pmatrix}$$

Figure 6G

Column Order $SCI\_1$

| Row Order | n1 | out | VDD | GND | n2 | | | | |
|---|---|---|---|---|---|---|---|---|---|
| n1 | $Ge_1^{[11]}$ | $Ge_1^{[12]}$ | $Ge_1^{[13]}$ | $Ge_1^{[14]}$ | $Gei_1^{[11]}$ | | $Ve_1^{[1]}$ | | $Ie_1^{[1]}$ |
| out | $Ge_1^{[21]}$ | $Ge_1^{[22]}$ | $Ge_1^{[23]}$ | $Ge_1^{[24]}$ | $Gei_1^{[21]}$ | | $Ve_1^{[2]}$ | | $Ie_1^{[2]}$ |
| VDD | $Ge_1^{[31]}$ | $Ge_1^{[32]}$ | $Ge_1^{[33]}$ | $Ge_1^{[34]}$ | $Gei_1^{[31]}$ | X | $Ve_1^{[3]}$ | = | $Ie_1^{[3]}$ |
| GND | $Ge_1^{[41]}$ | $Ge_1^{[42]}$ | $Ge_1^{[43]}$ | $Ge_1^{[44]}$ | $Gei_1^{[41]}$ | | $Ve_1^{[4]}$ | | $Ie_1^{[4]}$ |
| n2 | $Gie_1^{[11]}$ | $Gie_1^{[12]}$ | $Gie_1^{[13]}$ | $Gie_1^{[14]}$ | $Gi_1^{[11]}$ | | $Vi_1^{[1]}$ | | $Ii_1^{[1]}$ |

Bold, to add SCI_12 $Ge'12$ $Ie'12$ of Figure 6D

Figure 6H

Column Order $SCI\_1$

| Row Order | n1 | out | VDD | GND | n2 | | | | |
|---|---|---|---|---|---|---|---|---|---|
| n1 | $Ge'_1^{[11]}$ | $Ge'_1^{[12]}$ | $Ge'_1^{[13]}$ | $Ge'_1^{[14]}$ | 0 | | $Ve_1^{[1]}$ | | $Ie'_1^{[1]}$ |
| out | $Ge'_1^{[21]}$ | $Ge'_1^{[22]}$ | $Ge'_1^{[23]}$ | $Ge'_1^{[24]}$ | 0 | | $Ve_1^{[2]}$ | | $Ie'_1^{[2]}$ |
| VDD | $Ge'_1^{[31]}$ | $Ge'_1^{[32]}$ | $Ge'_1^{[33]}$ | $Ge'_1^{[34]}$ | 0 | X | $Ve_1^{[3]}$ | = | $Ie'_1^{[3]}$ |
| GND | $Ge'_1^{[41]}$ | $Ge'_1^{[42]}$ | $Ge'_1^{[43]}$ | $Ge'_1^{[44]}$ | 0 | | $Ve_1^{[4]}$ | | $Ie'_1^{[4]}$ |
| n2 | $Gie_1^{[11]}$ | $Gie'_1^{[12]}$ | $Gie'_1^{[13]}$ | $Gie'_1^{[14]}$ | 1 | | $Vi_1^{[1]}$ | | $Ii'_1^{[1]}$ |

Figure 6I

Column Order

| | VDD | GND | ... | | | SCI_2 |

Row Order

VDD
GND
...

$$\begin{vmatrix} Ge_2^{[11]} & Ge_2^{[12]} & Gei_2^{[11]} \\ Ge_2^{[21]} & Ge_2^{[22]} & Gei_2^{[21]} \\ \hline Gie_2^{[11]} & Gie_2^{[12]} & Gi_2^{[11]} \end{vmatrix} \times \begin{vmatrix} Ve_2^{[1]} \\ Ve_2^{[2]} \\ \hline Vi_2^{[1]} \end{vmatrix} = \begin{vmatrix} Ie_2^{[1]} \\ Ie_2^{[2]} \\ \hline Ii_2^{[1]} \end{vmatrix}$$

Figure 6J

Column Order

| | VDD | GND | ... | | | SCI_2 |

Row Order

VDD
GND
...

$$\begin{vmatrix} Ge'_2{}^{[11]} & Ge'_2{}^{[12]} & 0 \\ Ge'_2{}^{[21]} & Ge'_2{}^{[22]} & 0 \\ \hline Gie'_2{}^{[11]} & Gie'_2{}^{[12]} & 1 \end{vmatrix} \times \begin{vmatrix} Ve_2^{[1]} \\ Ve_2^{[2]} \\ \hline Vi_2^{[1]} \end{vmatrix} = \begin{vmatrix} Ie'_2{}^{[1]} \\ Ie'_2{}^{[2]} \\ \hline Ii'_2{}^{[1]} \end{vmatrix}$$

Figure 6K

Column Order: in, n1, out, VDD, GND — Top circuit

Row Order: In, n1, out, VDD, GND $$\begin{bmatrix} G^{[11]} & G^{[12]} & G^{[13]} & G^{[14]} & G^{[15]} \\ G^{[21]} & G^{[22]} & G^{[23]} & G^{[24]} & G^{[25]} \\ G^{[31]} & G^{[32]} & G^{[33]} & G^{[34]} & G^{[35]} \\ G^{[41]} & G^{[42]} & G^{[43]} & G^{[44]} & G^{[45]} \\ G^{[51]} & G^{[52]} & G^{[53]} & G^{[54]} & G^{[55]} \end{bmatrix} \times \begin{bmatrix} V^{[1]} \\ V^{[2]} \\ V^{[3]} \\ V^{[4]} \\ V^{[5]} \end{bmatrix} = \begin{bmatrix} I^{[1]} \\ I^{[2]} \\ I^{[3]} \\ I^{[4]} \\ I^{[5]} \end{bmatrix}$$

Figure 6L

Column Order: in, n1, out, VDD, GND — Top circuit

Row Order: In, n1, out, VDD, GND $$\begin{bmatrix} \mathbf{G^{[11]}} & \mathbf{G^{[12]}} & G^{[13]} & G^{[14]} & G^{[15]} \\ \mathbf{G^{[21]}} & \mathbf{G^{[22]}} & G^{[23]} & G^{[24]} & G^{[25]} \\ G^{[31]} & G^{[32]} & G^{[33]} & G^{[34]} & G^{[35]} \\ G^{[41]} & G^{[42]} & G^{[43]} & G^{[44]} & G^{[45]} \\ G^{[51]} & G^{[52]} & G^{[53]} & G^{[54]} & G^{[55]} \end{bmatrix} \times \begin{bmatrix} V^{[1]} \\ V^{[2]} \\ V^{[3]} \\ V^{[4]} \\ V^{[5]} \end{bmatrix} = \begin{bmatrix} I^{[1]} \\ I^{[2]} \\ I^{[3]} \\ I^{[4]} \\ I^{[5]} \end{bmatrix}$$

Bold, to add r1

Figure 6M

Column Order: in, n1, out, VDD, GND — Top circuit

Row Order: In, n1, out, VDD, GND

$$\begin{bmatrix} G^{[11]} & G^{[12]} & G^{[13]} & G^{[14]} & G^{[15]} \\ G^{[21]} & \mathbf{G^{[22]}} & G^{[23]} & G^{[24]} & \mathbf{G^{[25]}} \\ G^{[31]} & G^{[32]} & G^{[33]} & G^{[34]} & G^{[35]} \\ G^{[41]} & G^{[42]} & G^{[43]} & G^{[44]} & G^{[45]} \\ G^{[51]} & \mathbf{G^{[52]}} & G^{[53]} & G^{[54]} & \mathbf{G^{[55]}} \end{bmatrix} \times \begin{bmatrix} V^{[1]} \\ V^{[2]} \\ V^{[3]} \\ V^{[4]} \\ V^{[5]} \end{bmatrix} = \begin{bmatrix} I^{[1]} \\ I^{[2]} \\ I^{[3]} \\ I^{[4]} \\ I^{[5]} \end{bmatrix}$$

Bold, to add c1

Figure 6N

Column Order: in, n1, out, VDD, GND — Top circuit

Row Order: in, n1, out, VDD, GND $$\begin{bmatrix} G^{[11]} & G^{[12]} & G^{[13]} & G^{[14]} & G^{[15]} \\ G^{[21]} & G^{[22]} & G^{[23]} & G^{[24]} & G^{[25]} \\ G^{[31]} & G^{[32]} & G^{[33]} & G^{[34]} & G^{[35]} \\ G^{[41]} & G^{[42]} & G^{[43]} & G^{[44]} & G^{[45]} \\ G^{[51]} & G^{[52]} & G^{[53]} & G^{[54]} & G^{[55]} \end{bmatrix} \times \begin{bmatrix} V^{[1]} \\ V^{[2]} \\ V^{[3]} \\ V^{[4]} \\ V^{[5]} \end{bmatrix} = \begin{bmatrix} I^{[1]} \\ I^{[2]} \\ I^{[3]} \\ I^{[4]} \\ I^{[5]} \end{bmatrix}$$

Bold, to add SCI_1 *Ge'*1 *Ie'*1 of Figure 6H

Figure 6O

Column Order: in, n1, out, VDD, GND — Top circuit

Row Order: in, n1, out, VDD, GND $$\begin{bmatrix} G^{[11]} & G^{[12]} & G^{[13]} & G^{[14]} & G^{[15]} \\ G^{[21]} & G^{[22]} & G^{[23]} & G^{[24]} & G^{[25]} \\ G^{[31]} & G^{[32]} & G^{[33]} & G^{[34]} & G^{[35]} \\ G^{[41]} & G^{[42]} & G^{[43]} & G^{[44]} & G^{[45]} \\ G^{[51]} & G^{[52]} & G^{[53]} & G^{[54]} & G^{[55]} \end{bmatrix} \times \begin{bmatrix} V^{[1]} \\ V^{[2]} \\ V^{[3]} \\ V^{[4]} \\ V^{[5]} \end{bmatrix} = \begin{bmatrix} I^{[1]} \\ I^{[2]} \\ I^{[3]} \\ I^{[4]} \\ I^{[5]} \end{bmatrix}$$

Bold, to add SCI_2 *Ge'*2 *Ie'*2 of Figure 6J

METHOD AND SYSTEM FOR HIERARCHICAL CIRCUIT SIMULATION USING PARALLEL PROCESSING

CROSS REFERENCE TO RELATED APPLICATIONS

This application claims priority to U.S. Provisional Application Ser. No. 62/679,645, filed Jun. 1, 2018, entitled "Method And System For Hierarchical And Parallel Circuit Simulation," which is hereby incorporated by reference in its entirety.

FIELD OF THE INVENTION

The various embodiments described in this document relate in general to computer aided design of very large scale integrated circuits, and more specifically to method and system for hierarchical circuit simulation using parallel processing.

BACKGROUND

The increasing density and complexity of integrated circuits place higher and higher demand on the speed and capacity of computer systems performing circuit simulations for computer aided circuit design. Conventional circuit simulators, such as SPICE (Simulation Program with Integrated Circuit Emphasis) or SPICE 2, have been employed as a computer-aided design tool to analyze electromagnetic propagation behavior on circuits. Although SPICE or SPICE 2 could be used to simulate a microelectronic circuit, including the logic devices and the interconnect paths, a complete simulation using SPICE or SPICE 2 has become extremely time consuming, and may exceed the storage and processing capabilities of the computer system used to run the simulation, as the sizes and complexities of microelectronic circuits continue to increase.

SUMMARY

In some embodiments, a method to simulate a hierarchical circuit is performed using one or more computer systems. The one or more computer systems receive a hierarchical circuit netlist including a top circuit and a plurality of sub-circuit instances (SCIs) in a hierarchy, or receive a flat circuit netlist and partition the flat circuit into a hierarchical circuit netlist. The hierarchy includes a first level under the top circuit and at least one second level under the first level such that each sub-circuit instance (SCI) of the plurality of SCIs is a child of another SCI at a higher level or a child of the top circuit. In some embodiments, each level of the hierarchy includes at least one SCI, each of the plurality of SCIs have external ports, and at least one of the plurality of SCIs also includes internal nets.

In certain embodiment, the method can be performed through a series of iteration rounds. Each iteration round includes a bottom-up process to generate circuit equations for each SCI and the top circuit, followed by a top-down process to solve the circuit equations for the top circuit and the SCIs in the hierarchy. In each iteration round, the bottom-up process starts from the bottom level of the hierarchy and moves up the hierarchy one level at a time. For each level in the hierarchy and for each SCI in the level, the bottom-up process obtains first and second submatrices and first and second subvectors for the SCI. The first and second subvectors correspond to respective ones of the first and second submatrices. The first submatrix and the first subvector are then stored in one or more memory devices. The second submatrix and the second subvector are passed up to the next level in the hierarchy and incorporated into the circuit equations of a parent SCI.

In certain embodiments, multiple computer systems or multiple processors in one or more computer system can be used to generate the circuit equations and to extract the submatrices and subvectors for different SCIs at the same or different hierarchical levels in parallel. In certain embodiments, access to the second submatrix and the second subvector of a child SCI extracted by a first processor in a first computer system is passed or provided to a second processor in the first or a second computer system, which is used to generate the circuit equation of the parent SCI.

During the same iteration round, in the top-down process, the one or more computer systems further determines signal values in the top circuit, the signal values including signal values at the external ports of the SCIs at the first level immediately below the top circuit. Then, starting from the first level of the hierarchy, the one or more computer systems proceeds to determine external and internal signal values of each SCI at each level of the hierarchy. The external signal values of each SCI are passed down from its parent SCI or the top circuit, and are used, together the first submatrix and the first subvector of the SCI, to compute the internal signal values of the SCI.

Thus, in the bottom-up process, intermediate results of lower-level calculations are incorporated into higher-level calculations until the circuit equation for the top circuit is generated. In the top-down process, signal values from higher-level calculations are used in the lower-level calculations until the signal values of all the leaf SCIs are determined. The calculations related to the individual SCIs can be distributed among multiple processors of one or more computers. The calculation of any SCI can be simplified/skipped when the signals of the SCI change slowly or remain constant between previous consecutive iteration rounds. The method according to some embodiments enables simulation of very large circuit hierarchically at the same SPICE accuracy using multiple processors/computers. The method also has capabilities to speed up like FAST-SPICE while maintaining SPICE accuracy.

BRIEF DESCRIPTION OF THE DRAWINGS

The present embodiments are illustrated by way of example and not limitation in the figures of the accompanying drawings, in which like references indicate similar elements, and in which:

FIGS. 6A through 6O illustrate processed of obtaining submatrices and subvectors for each SCI in a hierarchical netlist, and constructing circuit equations for the top circuit, according to some embodiments;

DETAILED DESCRIPTION OF THE EMBODIMENTS

Figure 1A:
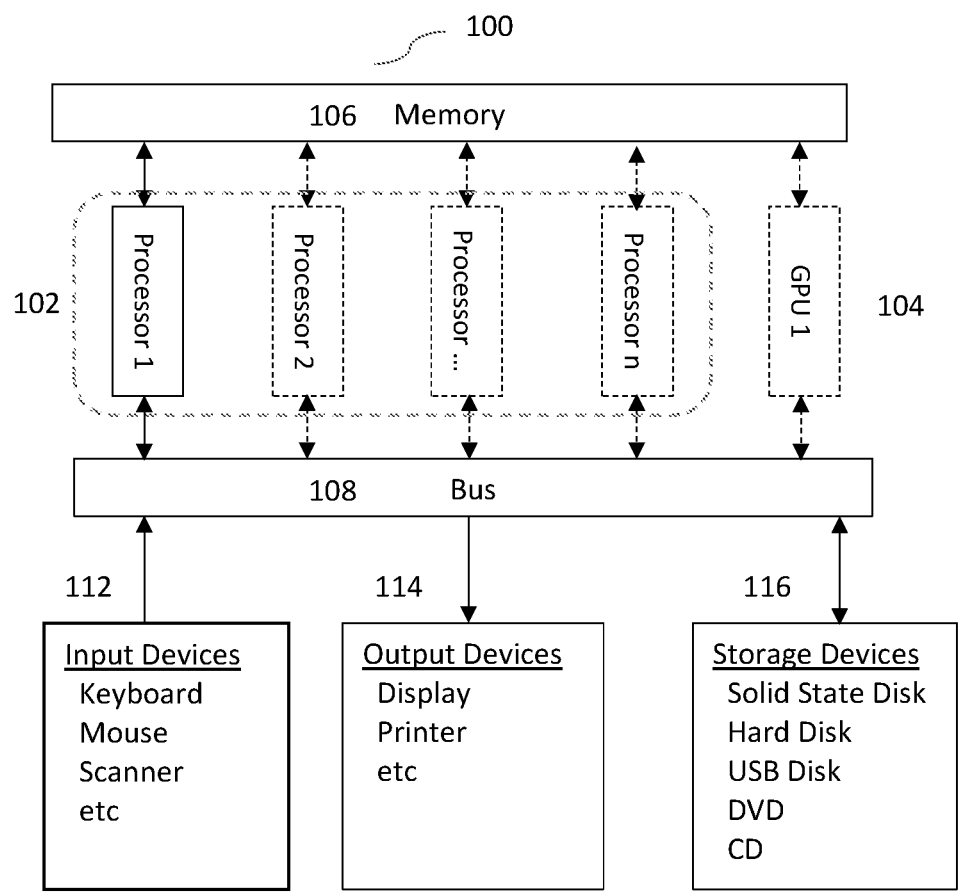
FIG. 1A is a block diagram of a computer system that can be configured to carry out, either individually or in conjunction with one or more other similarly configured computer systems, a method of simulating a hierarchical circuit according to some embodiments.

According to some embodiments, a method of simulating a circuit can be performed by one or more processors in one or more computer systems, each of the one or more computer systems including at least one processor. The one or more computer systems include or have access to one or more memory devices. FIG. 1A is a block diagram of a computer system 100 that can be configured to carry out, either individually or in conjunction with one or more other similarly configured computer systems, a method of simulating a circuit according to some embodiments. As shown in FIG. 1A, computer system 100 includes one or more processors 102 coupled to a bus 108, one or more optional graphic processing units (GPUs) 104 coupled to bus 108, memory 106 accessible by processors 102 and GPUs 104, and input devices 112, output devices 114, and storage device 116 coupled to bus 108. Input devices 112 may include, for example, keyboard, mouse, and scanner etc. Output devices 114 may include, for example, display and printer etc. Storage devices 116 may include, for example, solid state disks, hard disks, USB disks, DVD CD etc.

Figure 1B:
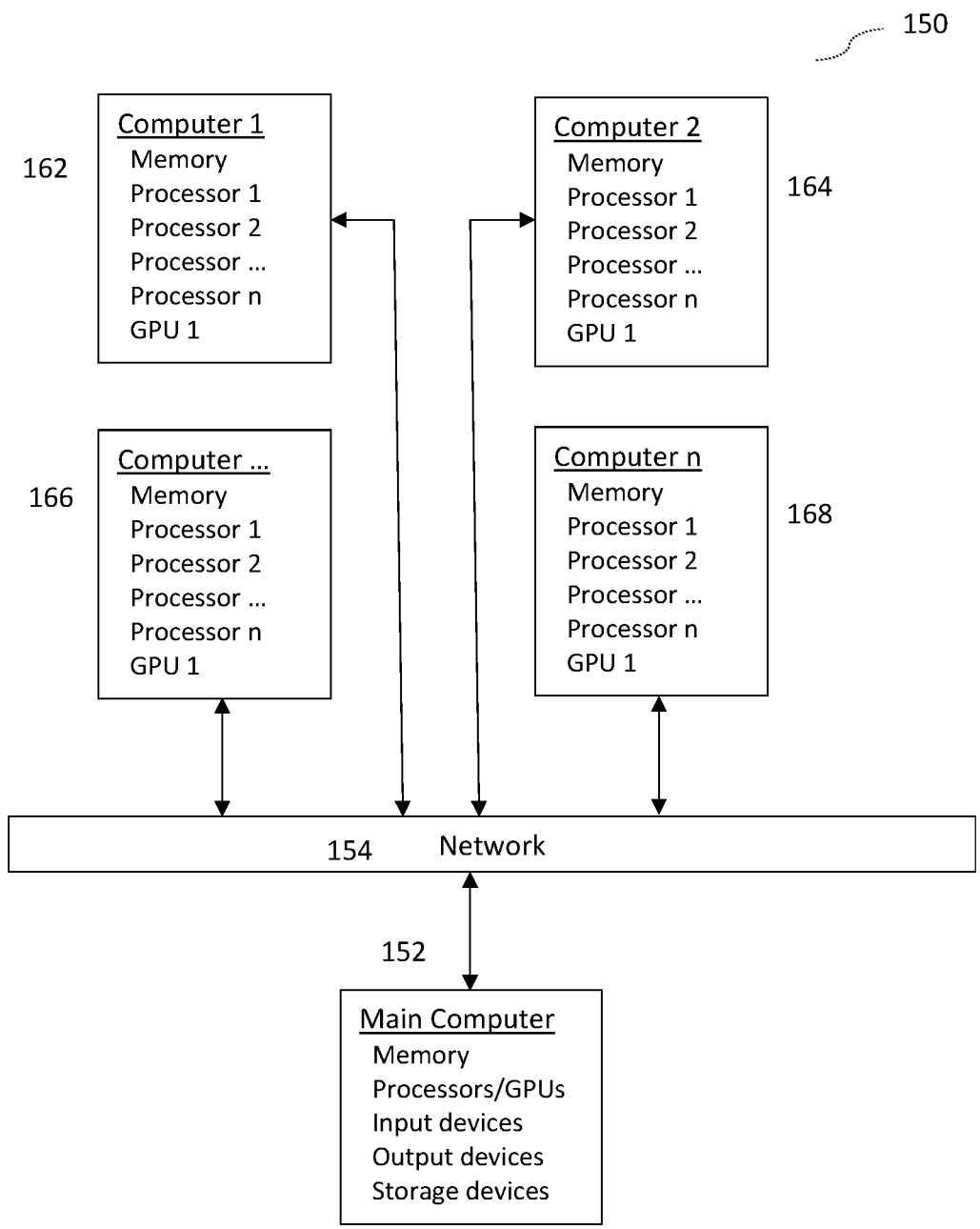
FIG. 1B is a block diagram illustrating multiple computer systems that can be used to jointly carry out a method of simulating a circuit according to some embodiments.

FIG. 1B is a block diagram illustrating a computer network 150 including multiple computer systems that can be used to jointly carry out a method of simulating a circuit according to some embodiments. In some embodiments, the multiple computer systems include a main computer system 152 and one or more other computer systems (e.g., computer systems 162, 164, 166, and/or 168), coupled with each other either directly or via a network 154. Network 154 can be a local area network (LAN) or wide area network (WAN). In some embodiments, computer system 100 can be used as each of computer systems 152, 162, 164, 166, and 168. A processor in main computer 152 is configured to receive a circuit netlist representing a circuit to be simulated, to start the method of simulating the circuit and to manage the other processors and/or GPUs in computer system(s) 152, 162, 164, 166, and/or 168 to calculate output results. The memory or memories 106 of computer system(s) 152, 162, 164, 166 and/or 168 are configured to store the circuit netlist, intermediate results and final results. In some embodiments, network 154 is configured pass the intermediate results among the computer systems 152, 162, 164, 166 and/or 168.

In some embodiments, a processor in main computer system 152 is configured to retrieve from storage devices 116, the circuit netlist (or netlist), which is a textual representation of the circuit to be simulated. The processor may also receive the netlist from another computer system or storage device via network 154, or as user input via input devices 112. In some embodiments, the circuit includes interconnected circuit elements. The design of a modern day integrated circuit (e.g., very large scale integrated circuit or VLSI) relies heavily on its hierarchical architecture, in which the circuit is viewed as a collection of building blocks or modules that are further divided into submodules or subcircuits in a recursive and hierarchical manner. The use of a subcircuit at a given level of the hierarchy is called an instance. A subcircuit instance at a given level may include other subcircuit instance(s) at a lower level. In this case, the subcircuit instance at the given level is said to be the parent of the other subcircuit instance(s) at the lower level, the other subcircuit instance(s) at the lower level can be said to be the child subcircuit instance(s) of the subcircuit instance at the given level. A subcircuit instance with no child subcircuit is called a leaf subcircuit instance. At any level of the hierarchy, there may also be primitive circuit elements or devices such as resistors, capacitors, and transistors, which does not include any instances of other subcircuits. In general, a subcircuit instance (SCI) is represented by its external ports and not by its contents (e.g., circuit components). A circuit that has all its subcircuit instances recursively replaced with their respective contents would be reduced to a hierarchical depth of one and is said to be flattened, or fully instantiated.

Figures 2A, 2B:
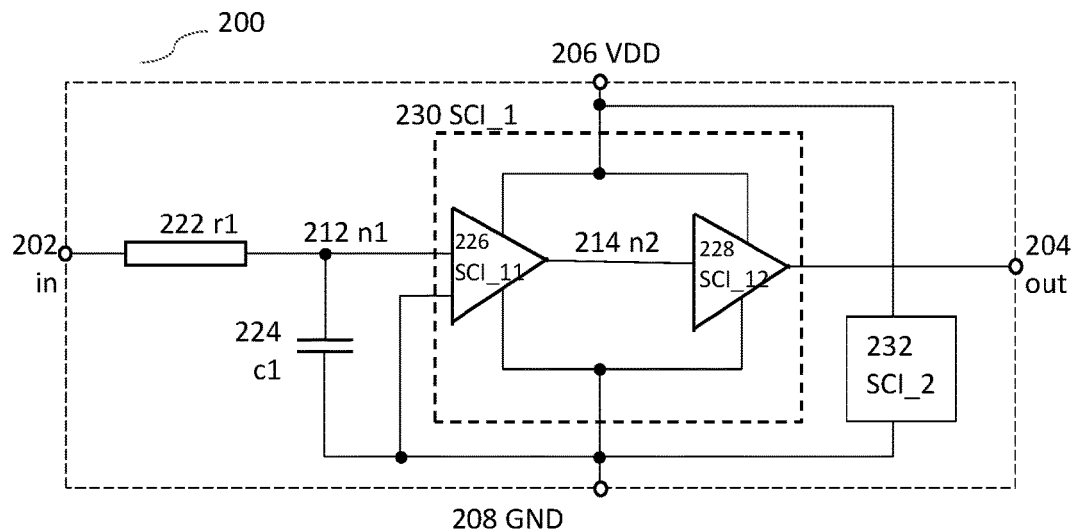
FIG. 2A illustrates a circuit 200 including primitive devices and subcircuit instances (SCIs), according to some embodiments.
FIG. 2B illustrates an example of a netlist for a circuit, according to some embodiments.

For example, FIG. 2A illustrates a circuit 200 including primitive devices and subcircuit instances (SCIs), according to some embodiments. As shown, circuit 200 includes a plurality of external ports (e.g., port "in" 202, port "out" 204, power terminal VDD 206, and ground terminal GND 208). Circuit 200 further includes subcircuit instances (e.g., SCI_1 230, SCI_2 232), primitive device (e.g., resistor r1 222 and capacitor c1 224), and internal nets (e.g., internal net "n1" 212 between subcircuit instance SCI_1 230 and resistor r1 222). Resistor r1 222 is coupled between port "in" 202 and internal net "n1" 212, and capacitor c1 224 is coupled between internal net "n1" 212 and ground terminal GND 208. SCI_1 230 has four external ports (e.g., port "n1" 212, port "out" 204, port VDD 206 and port GND 208). SCI_1 230 has two child SCIs (e.g., SCI_11 226 and SCI_12 228) and one internal net "n2" 214 between the two child SCIs. SCI_2 232 has two external ports (e.g., port VDD 206 and port GND 208) and no internal net. SCI_11 226 has external port "n1" 212, "n2" 214, VDD 206 and GND 208, and no internal net. SCI_12 228 has external ports "n2" 214, out 204, VDD 206 and GND 208, and no internal net. The external ports and internal nets of an SCI are also referred to as its nodes.

FIG. 2B illustrates an example of a netlist 201 for circuit 200, according to some embodiments. As shown, netlist 201 includes textual definition of circuit topology and element values in circuit 200. In netlist 201, each element in the circuit is specified by an element line including the element name (e.g., SCI_1), the connecting ports or nodes (e.g., n1 GND out VDD GND), and electrical parameter values if any.

Conventionally, a circuit hierarchy is typically flattened to the device level during circuit simulation. For example, circuit simulation programs such as SPICE would read a netlist of a circuit to be simulated and all of its input signals, and solve a set of mathematical equations involving all of the circuit components or elements in the flattened circuit to obtain the circuit response in the form of output signals. Because the circuit is flattened and fully instantiated, the device connectivity and device parameters for each of a large number (e.g., millions) of interconnected devices have to be stored during simulation. Such massive amount of memory usage makes it impractical to use existing circuit simulators to perform full-chip circuit simulation on today's VLSI circuits. Furthermore, solving the set of mathematical equations involving all of the circuit components or elements in the flattened circuit together makes it difficult, if not impossible, to use multiple processors or computers to speed up the calculation. Thus, conventional circuit programs fall short in both speed and capacity.

Figure 3A:
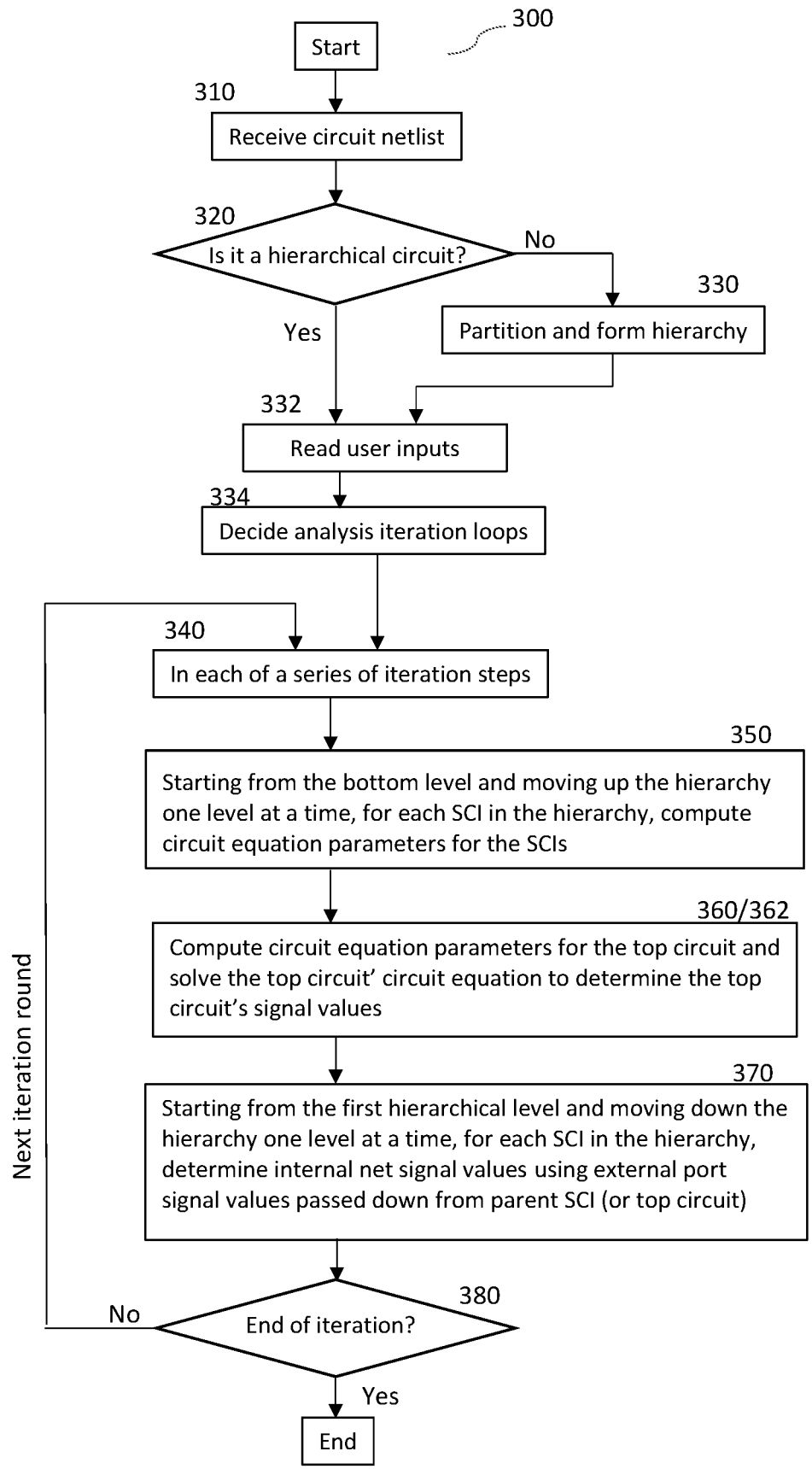
FIGS. 3A to 3D are flowcharts illustrating a method 300 of simulating a hierarchical circuit according to some embodiments.

Systems and methods for simulating a circuit according to some embodiments overcome the problems of conventional circuit simulators by utilizing the hierarchical structure of the circuit. FIGS. 3A to 3D are flowcharts illustrating a method 300 of simulating a circuit (e.g., circuit 200) according to some embodiments. Method 300 can be performed by one or more processors in one or more computer systems (e.g., computer system(s) 100, 152, 162, 164, 166, and/or 168). As shown in FIG. 3A, method 300 includes receiving (310), by one or more processors of the one or more computer systems, a netlist of the circuit to be simulated, and determining (320) if the netlist describes a hierarchical circuit. Sometimes the netlist can be transferred from a conventional simulator and is flattened. In this case, method 300 further includes partitioning (330) the netlist into a hierarchical structure.

Figure 4:
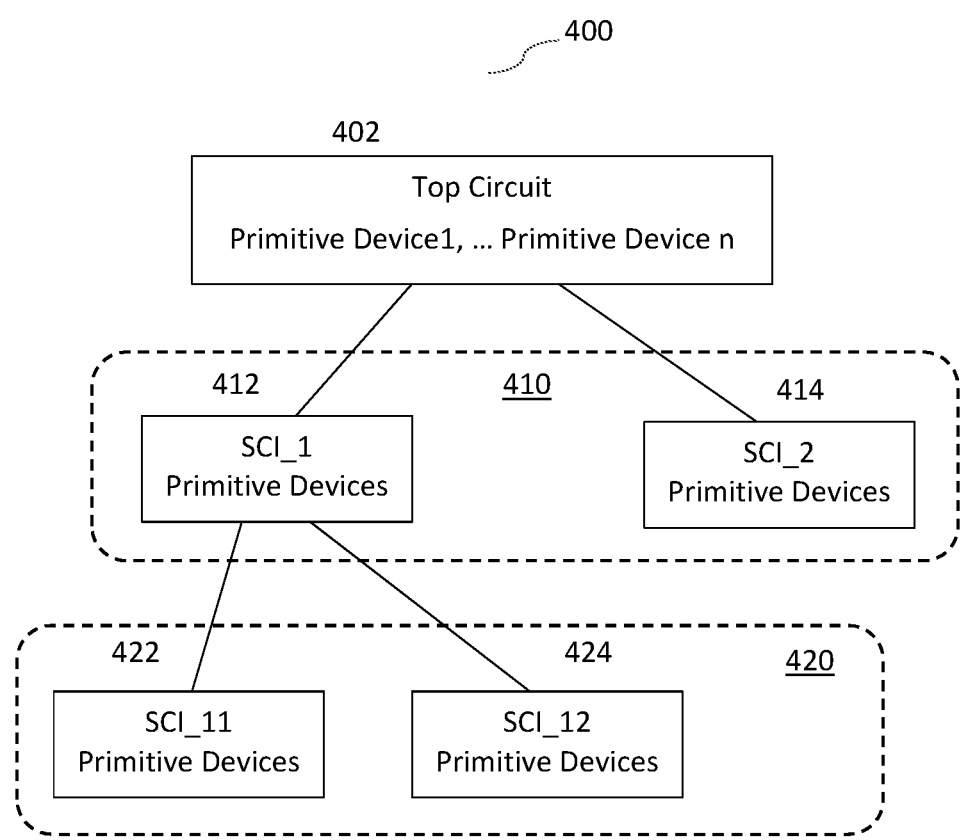
FIG. 4 illustrates a hierarchical netlist including a top circuit, primitive devices, and a plurality of sub-circuit instances, according to some embodiments.

For example, as shown in FIG. 4, a hierarchical netlist 400 for circuit 200 includes a top circuit 402, which includes primitive devices such as r1 and c1, and a plurality of sub-circuit instances (SCIs) (e.g., SCI_1 412 corresponding to SCI_1 230, SCI_2 414 corresponding to SCI_1 232, SCI_11 422 corresponding to SCI_1 226, and SCI_12 424 corresponding to SCI_1 228) forming at least three hierarchical levels, including a first level 410 under the top circuit 402 and a second level 420 (which happens to be the bottom level) under first level 410. First level 410 includes subcircuit instances SCI_1 412, SCI_2 414, and second level 420 includes subcircuit instances SCI_11 422, and SCI_12 424). Each sub-circuit instance (SCI) of the plurality of SCIs is a child of another SCI at a higher level or a child of the top circuit. Each sub-circuit instance (SCI) of the plurality of SCIs is a parent of one or more other SCIs at a lower level or it is a leaf SCI with no child SCI. Thus, each level of the hierarchy includes at least one SCI. In some embodiments, each of the plurality of SCIs (e.g., SCI_1 412) has external ports (e.g., port "n1" and output port 204), and at least one of the plurality of SCIs (e.g., SCI_1 230) includes one or more internal nets (e.g., node "n2"). In some embodiments, an external port of a child SCI could be an external port or internal net of the parent SCI, while any internal net of the child SCI is not an internal net of the parent SCI. In this example, top circuit 402 is at the top of the hierarchy and has child SCI_1 412 and SCI_2 414. SCI_1 412 has child SCI_11 422 and SCI_12 424. Also, SCI_2 414, SCI_11 422 and SCI_12 424 are leaf SCIs in the hierarchy and have no child SCIs. Each of the top circuit 402 and the SCIs 412, 414, 422, and 424 may also include primitive devices such as resistors, capacitors, inductors, mutual inductors, transmission lines, diodes, bipolar junction transistors (BJT), junction field effect transistors (JFET), metal-oxide-semiconductor field effect transistors (MOSFET), metal-semiconductor field effect transistors (MESFET), thin-film transistors (TFT), etc.

Figure 5A:
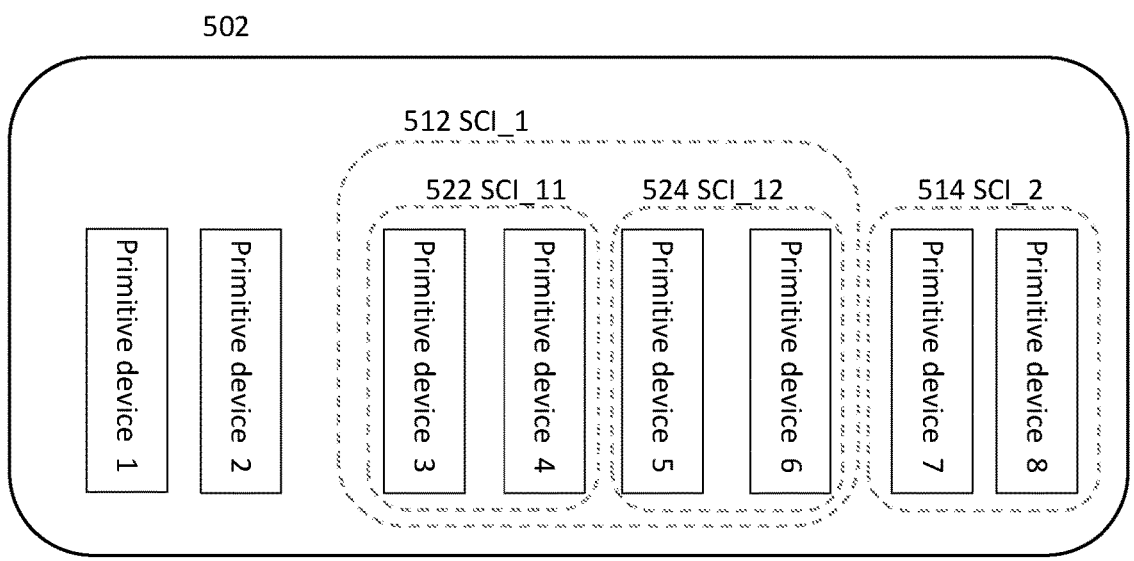
FIG. 5A illustrates a flattened circuit as an example.
Figure 5B:
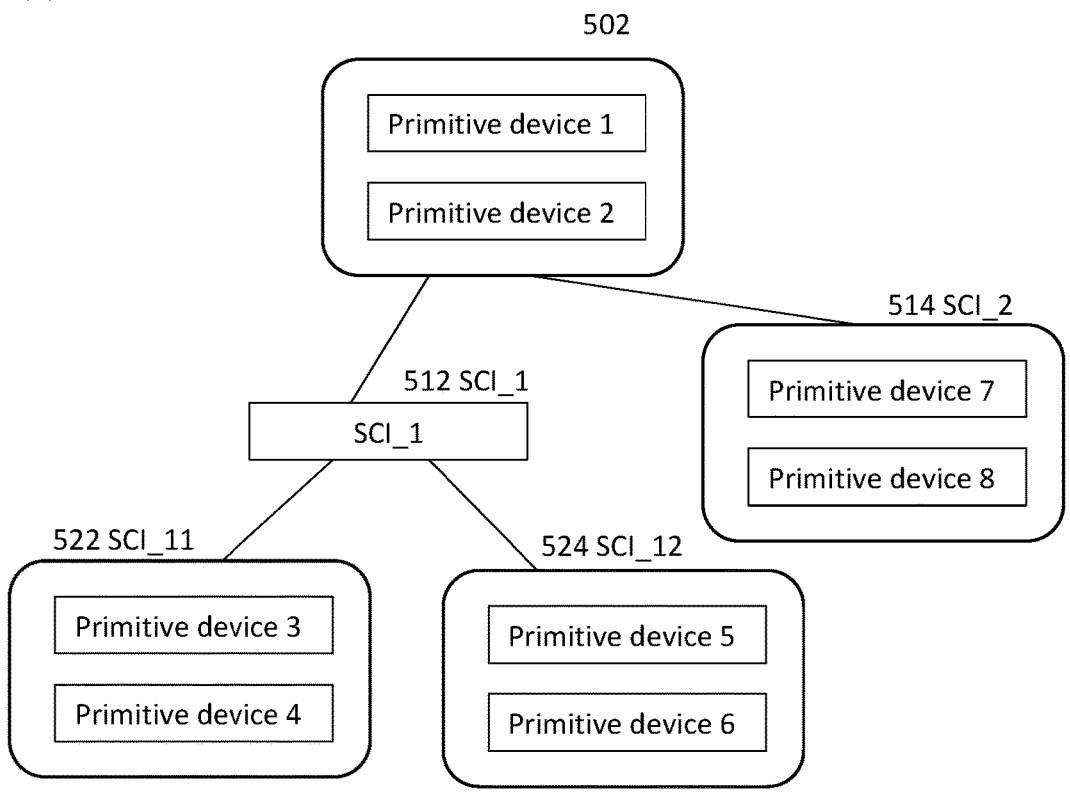
FIG. 5B illustrates a hierarchical circuit as an example.

In some embodiment, if the received circuit is a flat circuit netlist which has primitive devices but no SCIs and no hierarchical structure, method 300 would include partitioning (330) the flat circuit netlist to form a hierarchical netlist. In some embodiments, partitioning (330) the flat circuit may include grouping the primitive devices to different groups, add one or more SCIs to each group by moving primitive devices to the corresponding SCIs. For example, as shown in FIG. 5A, a circuit 502 when flattened is shown to include primitive device 1~8, all in one level. During partitioning, primitive device 3~4 are place in group 522 as SCI_11, primitive device 5~6 are place in group 524 as SCI_12, primitive device 7~8 are place in group 514 as SCI_2. SCI_11 and SCI_12 are grouped together in group 512 as SCI_1. Thus, after partitioning, circuit 502 has a hierarchical structure similar to that shown in FIG. 4, as illustrated in FIG. 5B.

In some embodiments, for efficiency purpose, partitioning (330) the flat circuit netlist to form a hierarchical netlist may further include adjusting the hierarchical structure by (1) collapsing part of the hierarchical structure (e.g., absorbing SCI_11 and SCI_12 into SCI_1), and (2) expanding the hierarchical structure by partitioning some of the SCIs into multiple SCIs in multiple levels.

In some embodiments, one or more processors in one or more computer systems receive respective portions of the circuit netlist. Each processor of the one or more processors may be assigned to perform a respective part of the simulation process and may read the entire circuit netlist or a respective portion of the circuit netlist that is required to perform the calculation assigned to the processor. The one or more processors may read the entire circuit netlist or respective portions of the circuit netlist in parallel and performed their respective parts of the simulation process in parallel.

Figure 2C:
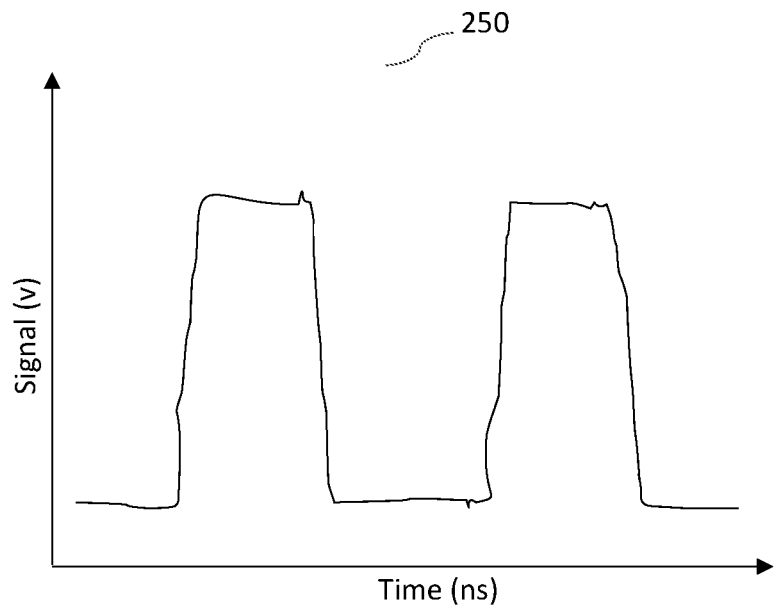
FIG. 2C illustrates an example of a wave form of an input signal changing with time according to some embodiments.
Figure 2D:
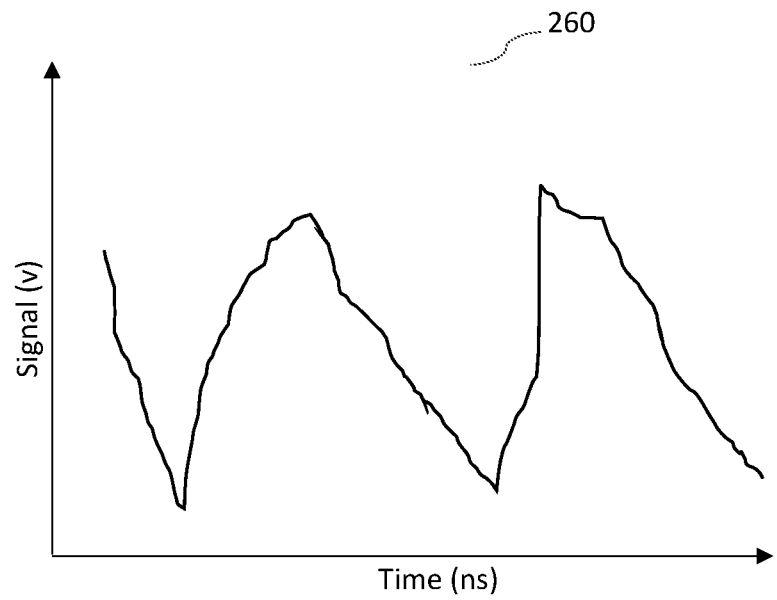
FIG. 2D illustrates an example of a simulated output signal changing with time according to some embodiments.

Referring to FIG. 3A, method 300 further includes reading (332) user inputs. In some embodiments, the user inputs may be provided from a user of the one or more computer systems as a wave form of an input signal at an external port (e.g., port "in") of the top circuit (e.g., circuit 200). FIG. 2C illustrates an example of a wave form of input signal changing with time according to some embodiments. Method 300 further includes determining (334) a series of iteration rounds (or steps) each corresponding to an input signal value of a set of input signal values at different points in time. As shown in FIG. 3A, in some embodiments, method 300 then iterates (340) through the series of iteration rounds to calculate a response output signal value at another external port (e.g., port "out") corresponding to each of the set of input signal values. FIG. 2D illustrates an example of an output signal changing with time, as simulation results output by the one or more computer system performing method 300.

Referring to FIG. 3A, method 300 includes, in each iteration round of the series of iteration rounds, a bottom-up process (350) that starts from the bottom level and moves up the hierarchy one level at a time to obtain (3502), for each level in the hierarchy and for each SCI in the level, first and second submatrices and first and second subvectors of the SCI. As shown in FIG. 3C, according to some embodiments, at each respective level of the hierarchy and for each respective SCI at the respective level, obtaining (3502) first and second submatrices and first and second subvectors of the SCI includes determining (3504) if the current iteration round is an initial iteration round (e.g., one of the first one or more iteration rounds in the series of iteration rounds). In response to the determination that the current iteration round is an initial iteration round, process 350 proceeds to generate (3514) a circuit equation representing electrical characteristics and behaviors of the each respective SCI in the form of, for example, a matrix equation, such as equation (1) below:

$$G \cdot V = 1 \qquad (1)$$

where G is a left-hand matrix of the SCI, V is a signal vector of the SCI, and I is a right-hand vector of the respective SCI. In its expanded form, equation (1) becomes the following for an SCI with n nodes:

$$\begin{bmatrix} G^{11} & \cdots & G^{1n} \\ \vdots & \ddots & \vdots \\ G^{n1} & \cdots & G^{nn} \end{bmatrix} \begin{bmatrix} V^1 \\ \vdots \\ V^n \end{bmatrix} = \begin{bmatrix} I^1 \\ \vdots \\ I^n \end{bmatrix} \quad (1a)$$

where $G_{ij}$ represents a right-hand matrix element corresponding to node i and node j (i=1, ..., n, j=1, ..., n), $I_i$ represents a right-hand vector element corresponding to node i, $V_i$ represents a signal value at node i. $G_{ij}$ and $I_i$ can be determined using, for example, standard SPICE method known to those skilled in the art. $V_i$ is a signal value to be calculated using the method 300. In some embodiments, the matrix equation is arranged such that nodes 1 through k are external ports (k=2, ..., n), and nodes k+1 through n are internal nets. In other words, the external ports and internal nets are organized separately in the matrix equation (1) or (1a). By organizing external ports and internal nets separately, the equation (1) can be expressed using submatrices Ge, Gie, Gei, Gi and subvectors Ve, Vi, Ie, Ii, as follows:

$$\begin{bmatrix} Ge & Gei \\ Gie & Gi \end{bmatrix} \times \begin{bmatrix} Ve \\ Vi \end{bmatrix} = \begin{bmatrix} Ie \\ Ii \end{bmatrix} \quad (2)$$

where $$Ge = \begin{bmatrix} G^{11} & \cdots & G^{1k} \\ \vdots & \ddots & \vdots \\ G^{k1} & \cdots & G^{kn} \end{bmatrix} \quad (2a)$$

$$Gie = \begin{bmatrix} G^{(k+1)1} & \cdots & G^{(k+1)k} \\ \vdots & \ddots & \vdots \\ G^{n1} & \cdots & G^{nk} \end{bmatrix} \quad (2b)$$

$$Gei = \begin{bmatrix} G^{1(k+1)} & \cdots & G^{1n} \\ \vdots & \ddots & \vdots \\ G^{k(k+1)} & \cdots & G^{kn} \end{bmatrix} \quad (2c)$$

$$Gi = \begin{bmatrix} G^{(k+1)(k+1)} & \cdots & G^{(k+1)n} \\ \vdots & \ddots & \vdots \\ G^{n(k+1)} & \cdots & G^{nn} \end{bmatrix} \quad (2d)$$

$$Ve = \begin{bmatrix} Ve^1 \\ \vdots \\ Ve^k \end{bmatrix} \quad (2e)$$

$$Vi = \begin{bmatrix} Vi^{k+1} \\ \vdots \\ Vi^n \end{bmatrix} \quad (2f)$$

$$Ie = \begin{bmatrix} Ie^1 \\ \vdots \\ Ie^k \end{bmatrix} \quad (2g)$$

$$Ii = \begin{bmatrix} Ii^{k+1} \\ \vdots \\ Ii^n \end{bmatrix} \quad (2h)$$

Figure 3B:
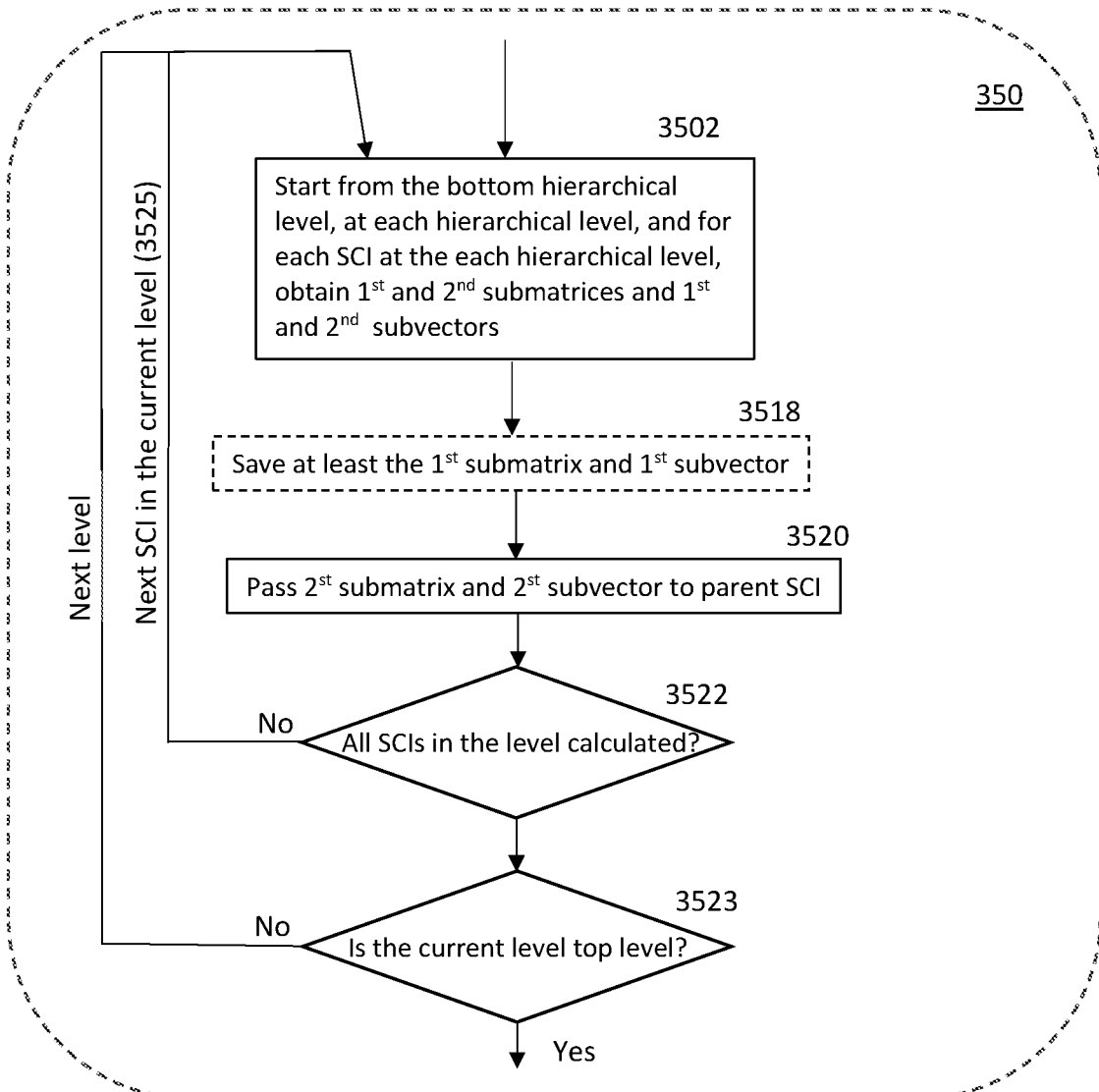
Figure 3C:
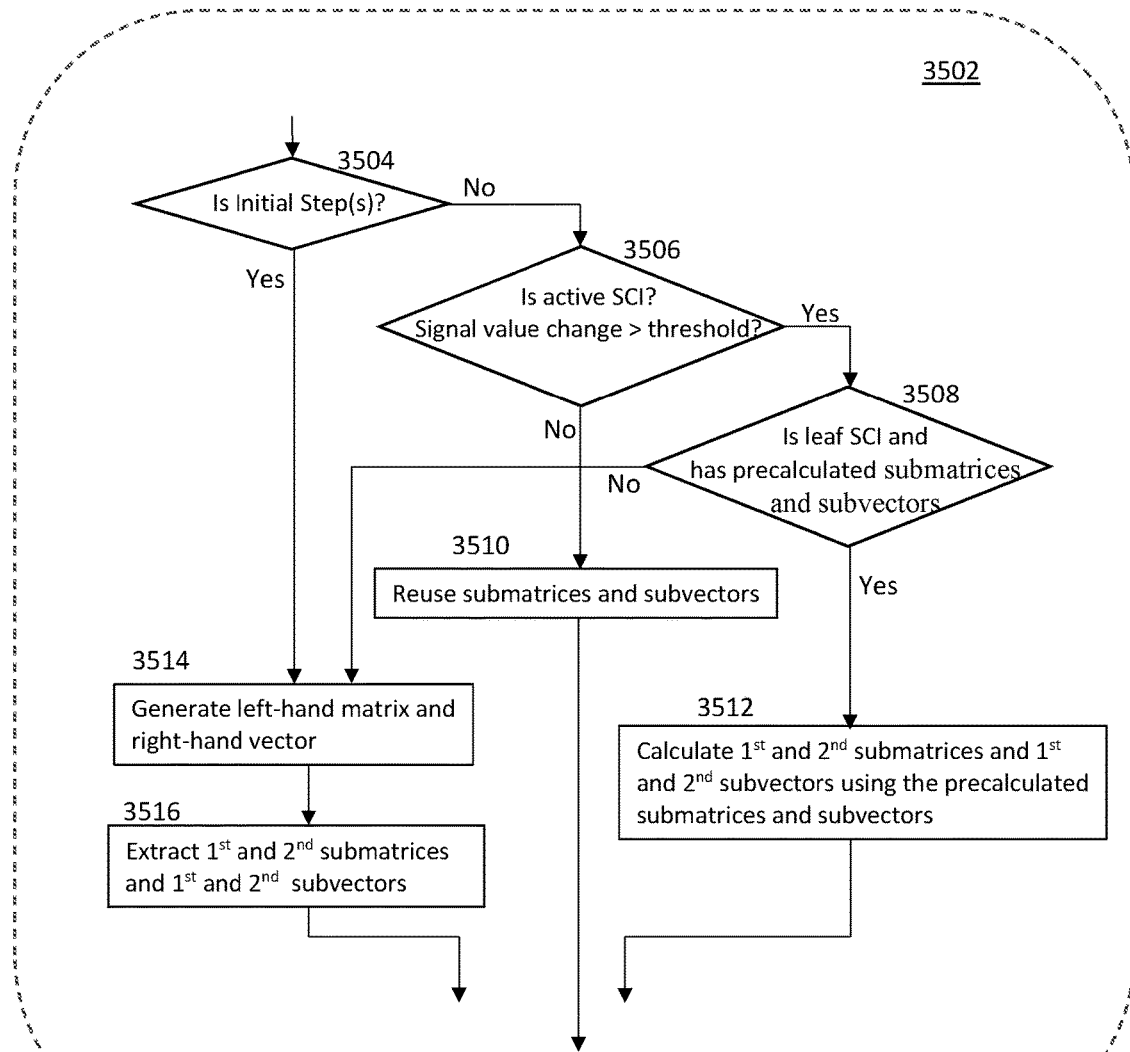

As shown in FIG. 3B, obtaining (3502) first and second submatrices and first and second subvectors of the SCI further includes extracting (3516) first and second submatrices from the left-hand matrix and first and second subvectors from the right-hand vector. The first and second subvectors correspond to respective ones of the first and second submatrices. In some embodiments, extracting (3516) the submatrices and subvectors includes performing Gaussian elimination on equation (2) to transform the left-hand matrix and the right-hand vector. As a result, equation (2) becomes equation (3), as follows:

$$\begin{bmatrix} Ge' & Gei' \\ Gie' & Gi' \end{bmatrix} \times \begin{bmatrix} Ve \\ Vi \end{bmatrix} = \begin{bmatrix} Ie' \\ Ii' \end{bmatrix} \quad (3)$$

where $$Ge' = \begin{bmatrix} Ge'^{11} & \cdots & Ge'^{1k} \\ \vdots & \ddots & \vdots \\ Ge'^{k1} & \cdots & Ge'^{kn} \end{bmatrix} \quad (3a)$$

$$Gie' = \begin{bmatrix} Gie'^{(k+1)1} & \cdots & Gie'^{(k+1)k} \\ \vdots & \ddots & \vdots \\ Gie'^{n1} & \cdots & Gie'^{nk} \end{bmatrix} \quad (3b)$$

$$Gei' = \begin{bmatrix} 0 & \cdots & 0 \\ \vdots & \ddots & \vdots \\ 0 & \cdots & 0 \end{bmatrix} \quad (3c)$$

$$Gi' = \begin{bmatrix} 1 & \cdots & 0 \\ \vdots & \ddots & \vdots \\ 0 & \cdots & 1 \end{bmatrix} \quad (3d)$$

where Gie' and Ge' are the extracted first and second submatrices, respectively, of the SCI, and Ii' and Ie' are the extracted first and second subvectors, respectively, of the SCI. Submatrix Gei' is now a [0] matrix, submatrix Gi' is now a unit matrix. Equation (3) can also be written as:

$$\begin{bmatrix} Ge' & \begin{bmatrix} 0 & \cdots & 0 \\ \vdots & \ddots & \vdots \\ 0 & \cdots & 0 \end{bmatrix} \\ Gie' & \begin{bmatrix} 1 & \cdots & 0 \\ \cdots & 1 & \cdots \\ 0 & \cdots & 1 \end{bmatrix} \end{bmatrix} \times \begin{bmatrix} Ve \\ Vi \end{bmatrix} = \begin{bmatrix} Ie' \\ Ii' \end{bmatrix} \quad (3e)$$

which can be broken into two sub-equations:

$$[Vi]=[Ii']-[Gie']\times[Ve] \quad (4a)$$

$$[Ge']\times[Ve]=[Ie'] \quad (4b)$$

From sub-equation (4a), internal signal value [Vi] can be calculated by external port signal values [Ve], first submatrix [Gie'] and first subvector [Ii']. In sub-equation (4b), second submatrix Ge' is representative characteristic matrix corresponding to the external ports, the second subvector Ie' is right hand vector corresponding to the external ports, vector Ve includes external port values, which are unknown at this point.

In some embodiments, using Gaussian elimination to transform equation (2) into equation (3) can be done by lower-upper (LU) decomposition or factorization of submatrix Gi, with proper row and/or column orderings or permutations, into two factors—a lower triangular matrix Li and an upper triangular matrix Ui, e.g., $$Gi = Li * Ui \quad (5a)$$

or $$\begin{bmatrix} Ge & Gei \\ Gie & Li*Ui \end{bmatrix} \times \begin{bmatrix} Ve \\ Vi \end{bmatrix} = \begin{bmatrix} Ie \\ Ii \end{bmatrix} \quad (5b)$$

Thus, by performing Gaussian elimination on equation (5b), [Ge], [Gie] and [Gei] are eliminated along with column/row of Li and Ui, and Gei' becomes [0].

In some embodiments, as shown in FIG. 3C, in response to the determination that the current iteration round is not one of the initial iteration round(s), obtaining (3502) first and second submatrices and first and second subvectors of the SCI would include determining (3506) if the respective SCI is an active SCI. In some embodiments, an SCI is an active SCI if any of its signal values has changed more than a preset threshold during previous iteration rounds e.g., the difference in the values of a particular signal (e.g., $Ve_i$, i= 1, . . . , n) determined in two consecutive iteration rounds immediately prior to the current iteration round is greater than the preset threshold for the particular signal. In response to the determination that the respective SCI is not an active SCI, obtaining (3502) first and second submatrices and first and second subvectors of the SCI could include retrieving and reusing (3510), in the current iteration round, the submatrices and subvectors obtained in the previous iteration round, and steps 3514, 3516, and 3518 for this SCI at the current iteration round can be skipped. In response to the determination that the respective SCI is an active SCI, obtaining (3502) first and second submatrices and first and second subvectors of the SCI would include determining whether the respective SCI is a leaf SCI and has precalculated submatrix and subvectors templates.

In response to the determination that the each respective SCI is a leaf SCI and has precalculated submatrix and subvector templates, obtaining (3502) first and second submatrices and first and second subvectors of the SCI would include calculating (3512) the first and second submatrices and the first and second subvectors for the leaf SCI from the precalculated submatrix and subvectors templates. In response to the determination that the each respective SCI is not a leaf SCI or does not have precalculated submatrix and subvector templates, the matrix equation representing electrical characteristics of the each respective SCI is generated (3514), and first and second submatrices are extracted (3516) from the left-hand matrix and first and second subvectors are extracted (3516) from the right-hand vector, as discussed above. Thus, for each SCI in the netlist, the left-hand matrix and right- and vector of the SCI are generated during the initial iteration rounds and when the SCI is an active SCI and is not a leaf SCI with precalculated submatrix and subvector templates.

In some embodiments, the first submatrix and the first subvector obtained in step 3502 are stored in the one or more memory devices (e.g., memory 106), while the second submatrix and the second subvector obtained in step 3502 are incorporated into the matrix equation for the parent SCI of the current SCI. Thus, as shown in FIG. 3B, process 350 further includes saving (3518) at least the first submatrix and the first subvector into memory (e.g., memory 106) and/or storage (e.g., storage 116). In some embodiments, the second submatrix and the second subvector of the current SCI are passed (3520) to the processor assigned to calculate the matrix equation for the parent SCI at the next hierarchical level. In some embodiment, the second submatrix and the second subvector of the respective SCI are cached by a respective processor performing calculations on the respective SCI if the respective processor is also designated to perform calculation on the parent SCI. Or, if another processor in the same or different computer system has been designated to perform calculation on the parent SCI, access to the memory space holding the second submatrix and the second subvector of the current SCI is provided by the respective processor to the other processor via bus 108 or network 154. In either case, the second submatrix and the second subvector of the current SCI is passed (3520) to and incorporated into the matrix equation of the parent SCI in the same iteration round.

Referring to FIG. 3B, after the submatrices and subvectors for the respective SCI have been extracted and saved and/or passed to the next level of calculation, process 350 proceeds to determine (3522) whether each SCI at the current hierarchical level has had its submatrices and subvectors extracted, and if so, to determine (3523) if the next hierarchical level above is the top level in the hierarchy. If there are more SCI(s) in the current level to be worked on, or the next hierarchical level above is not the top level in the hierarchy, process 350 returns to step 3502 to perform calculation on the next SCI at the same level or at the next level above. Process 350 completes after the submatrices and subvectors for each SCI in the netlist are obtained for the current iteration round.

As discussed above, generating (3514) a matrix equation representing electrical characteristics and behaviors of a parent SCI would include incorporating the second submatrix and the second subvector of each of its child SCI(s). Since process 350 starts from the bottom hierarchical level and moves upwards one level at a time, the second submatrix and the second subvector of each of the child SCI(s) should have already been extracted before process 350 starts to generate the matrix equation (e.g., equation (1)) for the parent SCI.

Figure 7A:
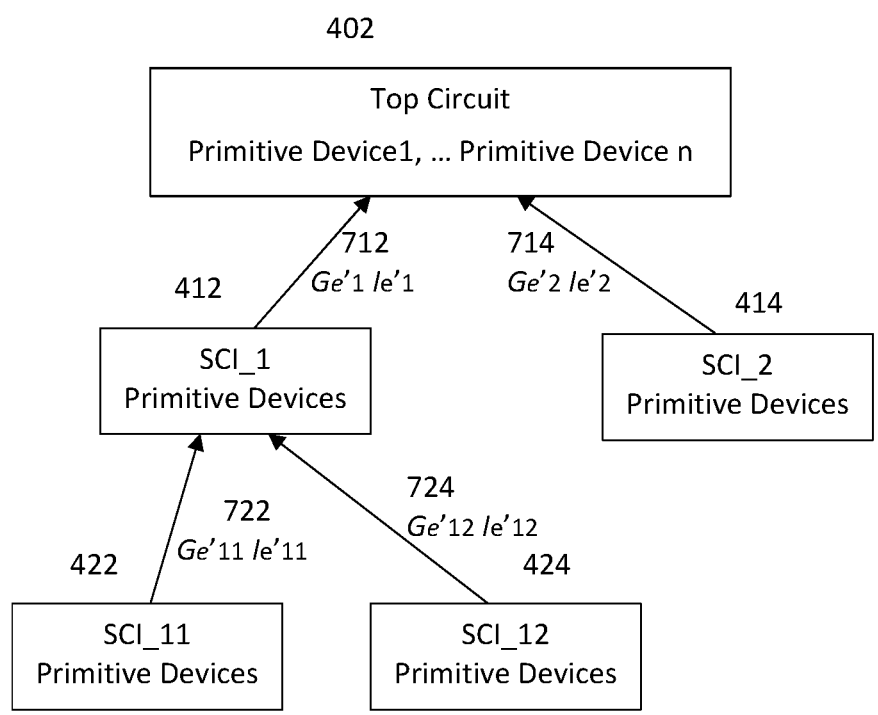
FIG. 7A illustrates a bottom-up process, according to some embodiments.

As example, FIGS. 6A through 6O illustrate how the submatrices and subvectors of are obtained for each SCI in hierarchical netlist 400 (shown in FIG. 4). Starting at a leaf SCI (e.g., SCI_11 422) at the lowest hierarchical level (i.e., bottom level 420), FIG. 6A shows the matrix equation for the SCI_11, including a left-hand matrix [$G_{11}$] and a right-hand vector [$I_{11}$] of SCI_11. SCI_11 has external ports "n1" 212, "n2" 214, VDD 206, GND 208 and internal nets represented by " . . . ." The equation representation of SCI_11 can be organized as shown in FIG. 6A, although the columns and rows orders can be different. Since this is a leaf SCI, the elements in the left-hand matrix [$G_{11}$] can be calculated either from existing templates or from standard SPICE circuit analysis. FIG. 6B shows the transformed matrix equation for the SCI_11 after Gaussian elimination, with extracted first and second submatrices [Gie'$_{11}$] and [Ge'$_{11}$], and first and second subvectors [Ii'$_{11}$] and [Ie'$_{11}$]. Since there is another SCI (e.g., SCI_12) at this level, process 350 proceeds to calculate the submatrices and subvectors for SCI_12. FIG. 6C shows the matrix equation for the SCI_12, including a left-hand matrix [$G_{12}$] and a right-hand vector [$I_{12}$] of SCI_12. SCI_12 has external ports "n2" 214, out, VDD 206, GND 208 and internal nets represented by " . . . ." The equation representation of SCI_12 can be organized as shown in FIG. 6C, although the columns and rows orders can be different. FIG. 6D shows the transformed matrix equation for the SCI_12 after Gaussian elimination, with extracted first and second submatrices [Gie'$_{12}$] and [Ge'$_{12}$], and first and second subvectors [Ie'$_{12}$] and [Ii'$_{12}$]. In some embodiments, the second submatrix [Ge'$_{11}$] and second subvector [Ie'$_{11}$] of SCI_11, and the second submatrix [Ge'$_{12}$] and second subvector [Ie'$_{12}$] of SCI_12, are passed up the hierarchical level and used to generate the left-hand matrix and right-hand vector of SCI_1, as shown in FIG. 7A.

After each SCI at the bottom level 420 has been calculated, process 350 continues to the next SCI (e.g., SCI_1) at the next level, which in this example is the first level 410 under the top circuit 402. SCI_1 has external ports "n1" 212, out 204, VDD 206, GND 208 and internal net "n2" 214, and the equation representation of SCI_1, with its the left-hand matrix [G$_1$] and right-hand vector [I$_1$], can be ordered as shown in FIG. 6E. Since this SCI_1 has child SCI's, according to some embodiments, the elements of the left-hand matrix [G$_1$] and right-hand vector [I$_1$] of SCI_1 are generated by incorporating the corresponding elements in the second submatrix and second subvector of each of its child SCI(s).

For example, as shown in FIG. 6F, SCI_11's second submatrix Ge'$_{11}$ is incorporated into some of the elements (marked in bold texts) of SCI_1's left-hand matrix by adding each element of SCI_11's second submatrix Ge'$_{11}$ to the element in the left-hand matrix [G$_1$] corresponding to the same row/column nodes (e.g., elements Ge'$_{11}$$^{[11]}$ corresponding to the nodes n1/n1, Ge'$_{11}$$^{[12]}$ corresponding to the nodes n1/n2, Ge'$_{11}$$^{[13]}$ corresponding to the nodes n1/VDD, and Ge'$_{11}$$^{[14]}$ corresponding to the nodes n1/GND, are added to elements Ga$_1$$^{[11]}$ corresponding to the nodes n1/n1, Ge$_{11}$$^{[11]}$ corresponding to the nodes n1/n2, Ge$_1$$^{[13]}$ corresponding to the nodes n1/VDD, and Ge$_1$$^{[14]}$ corresponding to the nodes n1/GND, respectively). Also, SCI_11's second subvector Ie'$_{11}$ is incorporated into some of the elements (marked in bold texts) of SCI_1's right-hand vector by adding each element of SCI_11's second subvector Ie'$_{11}$ to the element in the right-hand vector [I$_1$] corresponding to the same row node (e.g., elements Ie'$_{11}$$^{[1]}$ corresponding to the nodes "n1", Ie'$_{11}$$^{[2]}$ corresponding to the node "n2", Ie'$_{11}$$^{[3]}$ corresponding to the node VDD, and Ie'$_{11}$$^{[4]}$ corresponding to the node GND, are added to elements Ie$_1$$^{[1]}$ corresponding to the node "n1", Ii$_1$$^{[1]}$ corresponding to the node "n2", Ie$_1$$^{[3]}$ corresponding to the node VDD, and Ie$_1$$^{[4]}$ corresponding to the node GND, respectively).

Likewise, as shown in FIG. 6G, SCI_12's second submatrix Ge'$^{12}$ is incorporated into some of the elements (marked in bold texts) of SCI_1's left-hand matrix by adding each element of SCI_12's second submatrix Ge'$_{12}$ to the element in the left-hand matrix [G$_1$] corresponding to the same row/column nodes (e.g., elements Ge'$_{12}$$^{[11]}$ corresponding to the nodes n2/n2, elements Ge'$_{12}$$^{[12]}$ corresponding to the nodes n2/out, Ge'$_{12}$$^{[13]}$ corresponding to the nodes n2/VDD, and Ge'$_{12}$$^{[14]}$ corresponding to the nodes n2/GND, are added to elements G$_{11}$$^{[11]}$ corresponding to the nodes n2/n2, Gie$_1$$^{[12]}$ corresponding to the nodes n2/out, Gie$_1$$^{[13]}$ corresponding to the nodes n2/VDD, and Gie$_1$$^{[14]}$ corresponding to the nodes n2/GND, respectively). Also, SCI_12's second subvector Ie$_{12}$ is incorporated into some of the elements (marked in bold texts) of SCI_1's right-hand vector by adding each element of SCI_12's second submatrix Ge'$_{12}$ to the element in the right-hand vector [I$_1$] corresponding to the same row node (e.g., elements Ie'$_{12}$$^{[1]}$ corresponding to the nodes "n2", Ie'$_{12}$$^{[2]}$ corresponding to the node out, Ie'$_{12}$$^{[3]}$ corresponding to the node VDD, and Ie'$_{12}$$^{[4]}$ corresponding to the node GND, are added to elements Ii$_1$$^{[1]}$ corresponding to the node "n2", Ie$_1$$^{[2]}$ corresponding to the node out, Ie$_1$$^{[3]}$ corresponding to the node VDD, and Ie$_1$$^{[4]}$ corresponding to the node GND, respectively).

In other words, the elements of SCI_1's left-hand matrix can be generated using its child SCIs' second submatrices as follows: Ge$_1$$^{[11]}$=Ge'$_{11}$$^{[11]}$, Ge$_1$$^{[12]}$=0, Ge$_1$$^{[13]}$=Ge'$_{11}$$^{[13]}$, Ge$_1$$^{[14]}$=Ge'$_{11}$$^{[14]}$, Ge$_1$$^{[21]}$=0, Ge$_1$$^{[22]}$=Ge'$_{12}$$^{[22]}$, Ge$_1$$^{[23]}$=Ge'$_{12}$$^{[23]}$, Ge$_1$$^{[24]}$=Ge'$_{12}$$^{[24]}$, Ge$_1$$^{[31]}$=Ge'$_{11}$$^{[31]}$, Ge$_1$$^{[32]}$=Ge'$_{12}$$^{[32]}$Ge$_1$$^{[33]}$=Ge'$_{11}$$^{[33]}$+Ge'$_{12}$$^{[33]}$, Ge$_1$$^{[34]}$=Ge'$_{11}$$^{[34]}$+Ge'$_{12}$$^{[34]}$, Ge$_1$$^{[41]}$=Ge$_{11}$$^{[41]}$, Ge$_1$$^{[42]}$=Ge'$_{12}$$^{[42]}$, Ge$_1$$^{[43]}$=Ge'$_{11}$$^{[43]}$+Ge'$_{12}$$^{[43]}$, Ge$_1$$^{[44]}$=Ge'$_{11}$$^{[44]}$+Ge'$_{12}$$^{[44]}$, Gie$_1$$^{[11]}$=Ge'$_{11}$$^{[21]}$, Gie$_1$$^{[12]}$=Ge'$_{12}$$^{[12]}$, Gie$_1$$^{[13]}$=Ge'$_{11}$$^{[23]}$+Ge'$_{12}$$^{[13]}$, Gie$_1$$^{[14]}$=Ge'$_{11}$$^{[24]}$+Ge'$_{12}$$^{[14]}$, Gei$_1$$^{[11]}$=Ge'$_{11}$$^{[12]}$, Gei$_1$$^{[21]}$=Ge'$_{12}$$^{[12]}$, Gei$_1$$^{[31]}$=Ge'$_{11}$$^{[32]}$+Ge'$_{12}$$^{[31]}$, Gei$_1$$^{[41]}$=Ge'$_{11}$$^{[42]}$+Ge'$_{12}$$^{[41]}$, Gi$_1$$^{[11]}$=Ge'$_{11}$$^{[22]}$+Ge'$_{12}$$^{[11]}$. Also, the elements of SCI_1's right-hand vector can be generated using its child SCIs' second subvectors as follows: Ie$_1$$^{[1]}$=Ie'$_{11}$$^{[1]}$, Ie$_1$$^{[2]}$=Ie'$_{12}$$^{[2]}$, Ie$_1$$^{[3]}$=Ie'$_{11}$$^{[3]}$+Ie'$_{12}$$^{[3]}$, Ie$_1$$^{[4]}$=Ie'$_{11}$$^{[4]}$+Ie'$_{12}$$^{[4]}$, and Ii$_1$$^{[1]}$=Ie'$_{11}$$^{[2]}$+Ie'$_{12}$$^{[1]}$.

FIG. 6H shows transformed matrix equation for the SCI_1 after Gaussian elimination, with extracted first and second submatrices [Gie'$_1$] and [Ge'$_1$], and first and second subvectors [Ie'$_1$] and [Ii'$_1$] of SCI_1. FIG. 6I shows the generated left-hand matrix [G] and right-hand vector [I] of SCI_2. FIG. 6J shows the transformed matrix equation for the SCI_2 after Gaussian elimination, with extracted first and second submatrices [Gie'$_2$] and [Ge'$_2$], and first and second subvectors [Ii'$_2$] and [Ie'$_2$] of SCI_2. In some embodiments, the second submatrix [Ge'$_1$] and second subvector [Ie'$_1$] of SCI_1, and the second submatrix [Ge'$_2$] and second subvector [Ie'$_2$] of SCI_2, are passed up the hierarchical level and used to generate the left-hand matrix and right-hand vector of top circuit 402, as shown in FIG. 7A.

Thus, in some embodiments, Equation (2) for an SCI's can be formed after the submatrices and subvectors of each of its child SCI(s) have been obtained by incorporating the second submatrix Ge' and second subvector Ie' of each of its child SCI(s). When there are multiple child SCIs, the process to obtain the submatrices and subvectors for each child SCI can be carried out independently before, after, or in parallel with the processes to obtain the submatrices and subvectors for each of the other child SCIs. In other words, an SCI has calculation dependency on its child SCIs, but there is no calculation dependency of among the child SCIs.

Referring back to FIG. 3A, in some embodiments, method 300 further includes, in each iteration round of the series of iteration rounds, computing (360) circuit equation parameters for the top circuit and solving (362) the top circuit's circuit equation to determine the top circuit's signal values. In some embodiments, computing (360) circuit equation parameters for the top circuit includes incorporating the $2^{nd}$ submatrices and $2^{nd}$ subvectors of each of the SCIs in the first hierarchical level immediately under the top circuit. For example, FIG. 6K shows the matrix equation for top circuit 402, which includes a left-hand matrix G, signal vector V and a right hand vector I. Left-hand matrix G includes rows corresponding, respectively, to the top circuit's external ports (e.g., external ports "in," out, VDD, GND) and internal net(s) (e.g., internal net "n1"), and columns corresponding, respectively, to the top circuit's external ports (e.g., external ports "in," out, VDD, GND) and internal net(s) (e.g., internal net "n1"). Right hand vector I includes a set of elements corresponding, respectively, to the top circuit's external ports (e.g., external ports "in," out, VDD, GND) and internal net(s) (e.g., internal net "n1"). In some embodiments, each element in the left-hand matrix G can be computed using the corresponding element in the left-hand matrix of each of the primitive devices (e.g., r1 and c1) of top circuit 402 and the corresponding element in the $2^{nd}$ submatrix of each SCI (e.g., SCI_1 and SCI_2) in the first hierarchical level immediately below top circuit 402. Likewise, each element in the right-hand matrix I can be computed using the corresponding element in the right-hand vector of each of the primitive devices (e.g., r1 and c1) of top circuit 402 and the corresponding element in the $2^{nd}$ subvector of each SCI (e.g., SCI_1 and SCI_2) in the first hierarchical level immediately below top circuit 402.

For example, FIG. 6L shows that parameters associated with primitive device r1 in top circuit 402 are incorporated into some of the elements (marked in bold texts) of the top circuit's left-hand matrix by adding each of r1's parameters to the corresponding elements (e.g., elements corresponding to "n1" and "in," which are nodes on both sides of r1) in the left-hand matrix G and right-hand vector I of top circuit 402. FIG. 6M shows that parameters associated with primitive device c1 in top circuit 402 are incorporated into some of the elements (marked in bold texts) of the top circuit's left-hand matrix by adding each of c1's parameters to the corresponding elements (e.g., elements corresponding to "n1" and GND, which are nodes on both sides of c1) in the left-hand matrix G and right-hand vector I of top circuit 402.

FIG. 6N shows SCI_1's second submatrix $Ge'_1$ is incorporated into some of the elements (marked in bold texts) of the top circuit's left-hand matrix [G] by adding each element of SCI_1's second submatrix $Ge'_1$ to the corresponding element in the left-hand matrix [G] (e.g., elements $Ge'_1{}^{[11]}$ corresponding to the row/column n1/n1, $Ge'_1{}^{[12]}$ corresponding to the row/column n1/out, $Ge'_1{}^{[13]}$ corresponding to the row/column n1/VDD, and $Ge'_1{}^{[14]}$ corresponding to the row/column n1/GND, are added to elements $G^{[22]}$ corresponding to the row/column n1/n1, $G^{[23]}$ corresponding to the row/column n1/out, $G^{[24]}$ corresponding to the row/column n1/VDD, and $G^{[25]}$ corresponding to the row/column n1/GND, respectively, and so on). FIG. 6N also shows SCI_1's second subvector $Ie'_1$ is incorporated into some of the elements (marked in bold texts) of the top circuit's right-hand matrix [I] by adding each element of SCI_1's second subvector $Ie'_1$ to the corresponding element in the right-vector matrix [I] (e.g., elements $Ie'_1{}^{[1]}$ corresponding to the row n1, $Ie'_1{}^{[2]}$ corresponding to the row out, $Ie'_1{}^{[3]}$ corresponding to the row VDD, and $Ie'_1{}^{[4]}$ corresponding to the row GND, are added to elements $I^{[2]}$ corresponding to the row n1, $I^{[3]}$ corresponding to the row out, $I^{[4]}$ corresponding to the row VDD, and $I^{[5]}$ corresponding to the GND, respectively, and so on).

FIG. 6O shows SCI_2's second submatrix $Ge'_2$ is incorporated into some of the elements (marked in bold texts) of the top circuit's left-hand matrix [G] by adding each element of SCI_2's second submatrix $Ge'_2$ to the corresponding element in the left-hand matrix [G] (e.g., elements $Ge'_2{}^{[11]}$ corresponding to the row/column VDD/VDD, AND $Ge'_2{}^{[12]}$ corresponding to the row/column VDD/GND are added to elements $G^{[44]}$ corresponding to the row/column VDD/VDD, $G^{[45]}$ corresponding to the row/column VDD/GND, respectively, and so on). FIG. 6O also shows SCI_2's second subvector $Ie'_2$ is incorporated into some of the elements (marked in bold texts) of the top circuit's right-hand matrix [I] by adding each element of SCI_2's second subvector $Ie'_2$ to the corresponding element in the right-vector matrix [I] (e.g., elements $Ie'_2{}^{[1]}$ corresponding to the row VDD, and $Ie'_2{}^{[2]}$ corresponding to the row GND, are added to elements $I^{[4]}$ corresponding to the row VDD, $I^{[5]}$ corresponding to the row GND, respectively, and so on).

Referring back to FIG. 3A, in some embodiments, method 300 further includes, in each iteration round of the series of iteration rounds, computing (360) circuit equation parameters for the top circuit and solving (362) the top circuit's circuit equation to determine the top circuit's signal values. Using the hierarchical circuit simulation approach according to some embodiments, the dimensions of the matrix equation for the top circuit is much smaller than the flattened whole circuit because matrix equation for the top circuit only includes parameters associated with the top circuit's external ports and the internal nets between its primitive devices and the SCIs in the first hierarchical level immediately below the top circuit. Furthermore, the elements in the top circuit's left-hand matrix and right-hand vector can determined by incorporating the second submatrix and second subvector of each of the SCI(s) in the first level, as discussed above. Thus, given the signal values at some of the top circuit's external ports (e.g., $V^{[1]}$ corresponding to external port "in"), the signal values at others of the top circuit's external ports (e.g., $V^{[3]}$ corresponding to external port "out," $V^{[4]}$ corresponding to external port VDD, and $V^{[5]}$ corresponding to external port GND) and its internal net(s) (e.g., $V^{[2]}$ corresponding to internal net "n1") can be readily solved using the top circuit's matrix equation by one or more processors in computer system 100 or 150.

In some embodiments, at least some of the signal values of the top circuit are passed down to the next hierarchical levels and used to determine some of the signal values for the SCIs in the next hierarchical level, at least some of which are then passed down and used to determine the signal values for the SCI's in the hierarchical level below the next hierarchical level, and so on. As shown FIG. 3A, method 300 further includes, in each iteration round of the series of iteration rounds, a top-down process (370) that determine lower-level SCI's signal values using the signal values passed down from higher-level SCIs (or top circuit), starting from the first hierarchical level and moving down the hierarchy one level at a time.

Figure 3D:
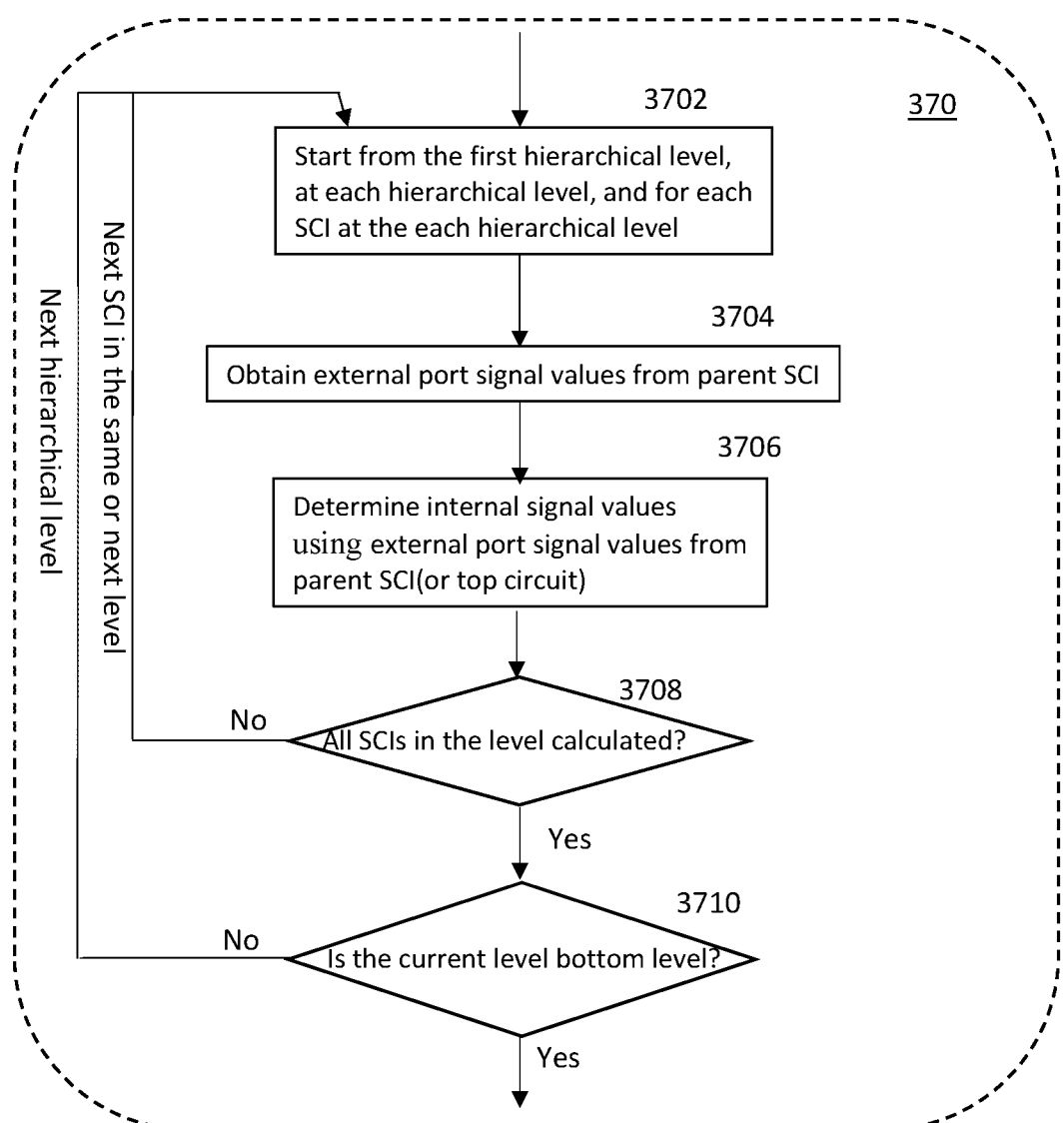

As shown in FIG. 3D, according to some embodiments, process 370 performs circuit calculation on each SCI in the netlist, starting (3702) from the first level of the hierarchy and moving down the hierarchy one level at a time. For each SCI at a particular level, process 370 includes obtaining (3704) signal values of the SCI's external ports from the SCI's parent SCI (or the top circuit), and determining (3706) the signal values of the SCI's internal nets using the external ports' signal values. Process 370 then proceeds to determine (3708) whether signal values for all of the SCIs in the current level have been calculated. If not all SCIs in the current level have had their signal values calculated, process 370 then moves to the next SCI in the same level and repeats steps 3704 and 3706 for the next SCI. If signal values for all of the SCIs in the current level have been calculated for the current iteration round, process 370 proceeds to determine whether the current level is the bottom level (or whether no other level(s) are below the current level). If the current level is not the bottom level, process 370 moves to the next hierarchical level and repeats steps 3704 and 3706 for each SCI in the next hierarchical level. Otherwise, process 370 completes and process 300 continues to determine (380) whether the current iteration round is the last iteration round, and repeats processes 350, 360/362, and 370 for the next iteration round if the current iteration round is not the last iteration round.

Figure 7B:
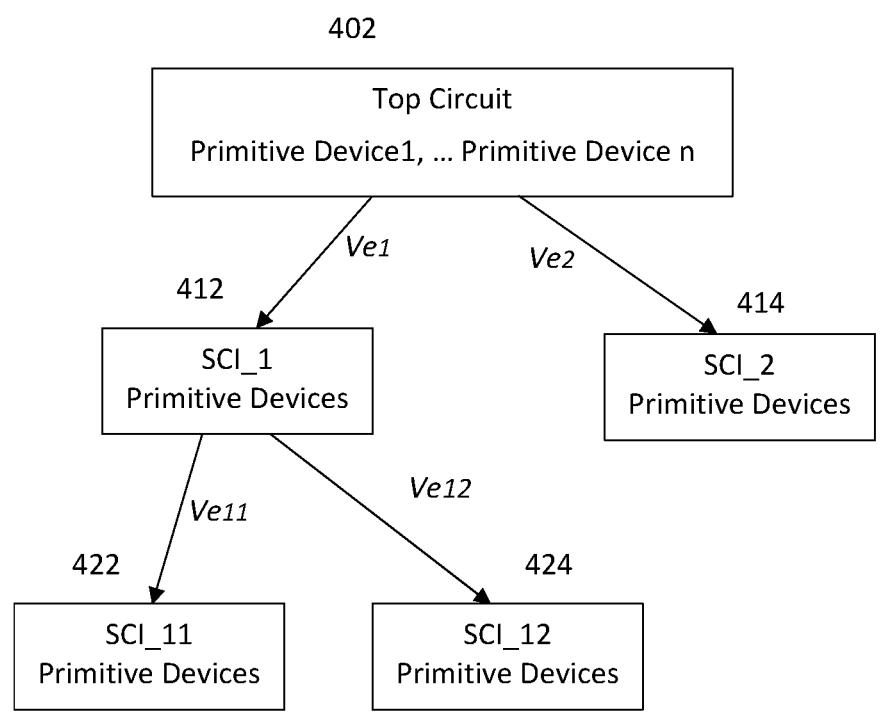
FIG. 7B illustrates a top-down process, according to some embodiments.

For example, for the hierarchical circuit 400, signal vector V in the matrix equation shown in FIG. 6K for top circuit 402 include signal values at nodes "n1", "out," VDD and GND. Nodes "n1", "out," VDD and GND happen to be the external ports of SCI_1, and nodes VDD and GND happen to be the external ports of SCI_2. Thus, the signal values at "n1", "out" VDD, and GND correspond to the signal values in subvector [Ve$_1$], the signal values at VDD, and GND also correspond to the signal values in subvector [Ve$_2$]. In some embodiments, as shown in FIG. 7B, the signal values at "n1", "out" VDD, and GND, which correspond to the signal values in subvector [Ve$_1$], are passed down the hierarchy and used to calculate the signal values [Vi$_1$] at the internal net(s) of SCI_1 using equation 4(a). Likewise, as also shown in FIG. 7B, the signal values at VDD and GND, which correspond to the signal values in subvector [Ve$_2$], are passed down the hierarchy and can be used to calculate the signal values [Vi$_2$] at the internal net(s) of SCI_2 (if there is any) using equation 4(a).

In this example, SCI_2 does not have any internal net. SCI_1 has an internal net "n2," which is an external port for SCI_11 and SCI_12 at next level below. In some embodiments, as shown in FIG. 7B, the signal values at "n1", "n2" VDD, and GND, which correspond to the signal values in subvector [Ve$_{11}$], are passed down the hierarchy and can be used to calculate the signal values [Vi$_{11}$] at the internal net(s) of SCI_11 (if there is any) using equation 4(a). Likewise, as also shown in FIG. 7B, the signal values at "n2," "out," VDD and GND, which correspond to the signal values in subvector [Ve$_{12}$], are passed down the hierarchy and can be used to calculate the signal values [Vi$_{12}$] at the internal net(s) of SCI_12 (if there is any) using equation 4(a).

Figure 8A:
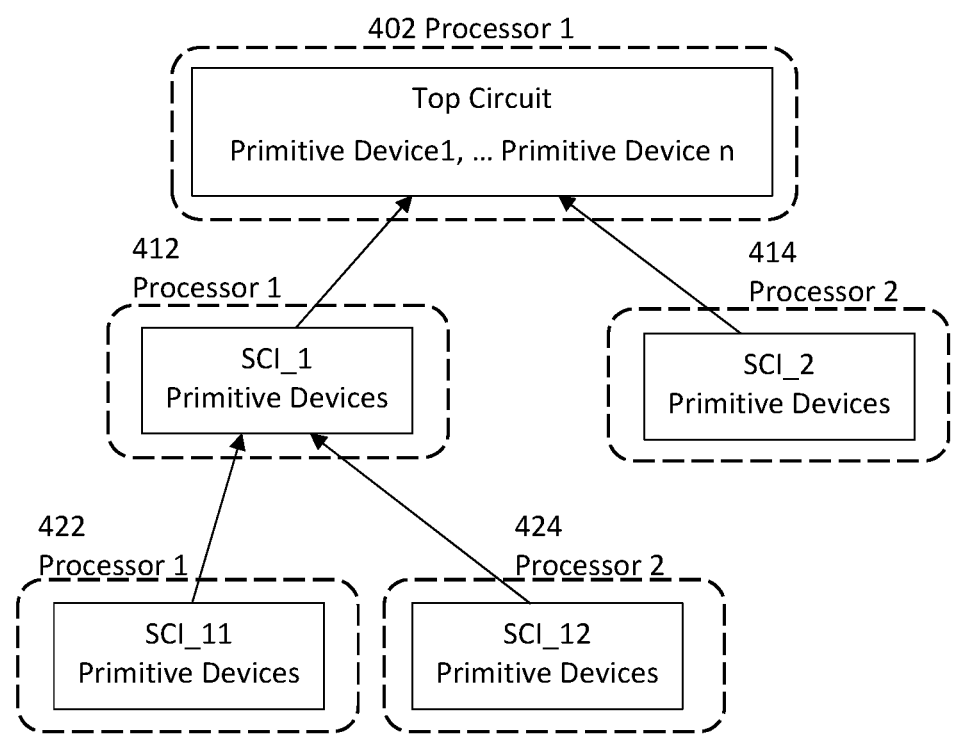
FIGS. 8A and 8B illustrate hierarchical circuit simulation using parallel processing, according to some embodiments.

In some embodiments, the matrices/vectors and submatrices/subvectors of different SCIs' in hierarchical circuit 400, as illustrated in FIGS. 6A through 6O, can be computed in different processors/computers. For example, as shown in FIG. 8A, a first processor (e.g., processor 1) in a first computer can be assigned to compute the submatrices/subvectors of SCI_11, while a second processor (e.g., processor 2) in the first or a second computer may be assigned to compute the submatrices/subvectors of SCI_12. The second processor (e.g., processor 2) may pass the second submatrix/subvector of SCI_12 to the first processor (e.g., processor 1), which would incorporate the second submatrices/subvectors of SCI_11 and SCI_12 into SCI_1, and compute the submatrices/subvectors of SCI_1. The second processor (e.g., processor 2) may compute the submatrices/subvectors of SCI_2 at about the same time when the submatrices/subvectors of SCI_1 is computed. The second processor (e.g., processor 2) can then provide the second submatrices/subvectors of SCI_2 to the first processor (e.g., processor 1) to compute the left-hand matrix and right-hand vector of the top circuit 402.

Figure 8B:
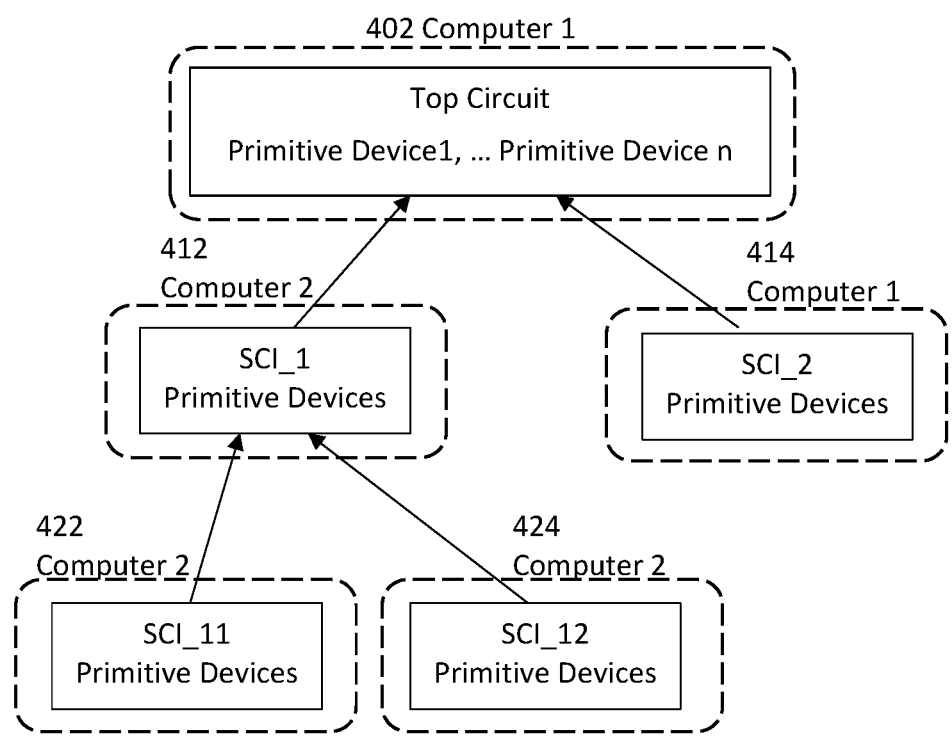

As another example, as shown in FIG. 8B, the second processor (e.g., processor 2) can be assigned to compute the submatrices/subvectors of SCI_11, SCI_12 and SCI_1, while the first processor (e.g., processor 1) may be assigned to compute the submatrices/subvectors of SCI_2 and the top circuit.

Thus, the methods according to some embodiments allow the computation of the circuit equations to be distributed across multiple processors in a single or multiple computer systems, which operate in parallel to perform the simulation. Furthermore, since the second submatrices and second subvectors of each SCI in the netlist are passed up the hierarchical levels and incorporated into the left-hand matrices and right-hand vectors of their respective parent SCIs or the top circuit, they do not need to be saved into memory 106 or storage 116 of the computer system(s) performing the calculation for the SCI. Thus, the methods according to certain embodiments provide faster simulation with significantly reduced memory requirements, making it possible to perform whole circuit simulation on very large-scale integrated circuits.

What is claimed is:

1. A method performed by one or more computer systems to simulate a circuit, each of the one or more computer systems including at least one processor, the one or more computer systems including or having access to one or more memory devices, comprising:

receiving, by one or more processors of the one or more computer systems, a netlist of the circuit, the netlist including a top circuit and a plurality of sub-circuit instances (SCIs) forming a hierarchy having a first level under the top circuit and at least one second level under the first level such that each sub-circuit instance (SCI) of the plurality of SCIs is a child of another SCI at a higher level or a child of the top circuit, and that each SCI of the plurality of SCIs is either a leaf in the hierarchy or a parent of a different SCI at a lower level, each of the plurality of SCIs having external ports, at least one of the plurality of SCIs including internal nets; and for each iteration step of a series of iteration steps:
starting from a bottom level of the hierarchy, for each respective level of the hierarchy and for each respective SCI at the respective level: obtaining, by a processor of the one or more computer systems, first and second submatrices and first and second subvectors of the respective SCI, and storing the first submatrix and the first subvector of the respective SCI in one or more memory devices, wherein the first and second subvectors of the respective SCI correspond to respective ones of the first and second submatrices of the respective SCI; wherein, for at least one first SCI of the plurality of SCIs and during at least one of the series of iteration steps, obtaining first and second submatrices and first and second subvectors of the first SCI includes incorporating second submatrix and second subvector of each of one or more second SCIs into a circuit equation representing electrical characteristics of the first SCI, and extracting the first and second submatrices and the first and second subvectors of the first SCI from the circuit equation, each of the one or more second SCIs being a child of the first SCI;

determining, by one or more processors of the one or more computer systems, signal values in the top circuit, the signal values including signal values at external ports of the top circuit and signal values at the external ports of the SCIs at the first level immediately below the top circuit;

starting from the first level of the hierarchy, determining, by one or more processors of the one or more computer systems, signal values of each specific SCI at each level of the hierarchy, wherein certain signal values of a third SCI corresponding to external signal values of a fourth SCI are passed down to the fourth SCI and used to determine internal signal values of the fourth SCI, together with first submatrix and first subvector of the fourth SCI stored in the one or more memory devices, the fourth SCI being a child of the third SCI.

2. The method of claim 1, wherein the circuit equation includes a left-hand matrix and a right-hand vector, and wherein the first and second submatrices of the first SCI are extracted from the left-hand matrix, and the first and second subvectors of the first SCI are extracted from the right-hand vector.

3. The method of claim 1, wherein the series of iteration steps include one or more initial iteration steps, wherein, for each iteration step subsequent to the one or more initial iteration steps, obtaining first and second submatrices and first and second subvectors of the respective SCI comprises determining whether the respective SCI is an active SCI, and in response to the respective SCI is not an active SCI, reusing first and second submatrices and first and second subvectors obtained for the respective SCI in a prior iteration step.

4. The method of claim 3, wherein determining whether a respective SCI is active comprises determining whether any signal values of the respective SCI has changed by more than a preset threshold during previous iteration steps.

5. The method of claim 1, wherein the series of iteration steps include one or more initial iteration steps, wherein, for each iteration step subsequent to the one or more initial iteration steps, obtaining first and second submatrices and first and second subvectors of the respective SCI comprises determining whether the respective SCI is a leaf SCI.

6. The method of claim 5, further comprising, in response to the respective SCI is a leaf SCI, determining whether the leaf SCI is an active SCI and has corresponding precalculated submatrix templates and subvector templates, and in response to the respective SCI is an active SCI and has precalculated submatrix templates and subvector templates, computing the first and second submatrices and the first and second subvectors of the respective SCI using the precalculated submatrix templates and subvector templates.

7. The method of claim 6, wherein determining whether a respective SCI is active comprises determining whether any signal value of the respective SCI has changed more than a preset threshold during previous iteration steps.

8. The method of claim 1, wherein obtaining first and second submatrices and first and second subvectors of a particular SCI on a particular level of the hierarchy is independent of obtaining first and second submatrices and first and second subvectors of another SCI on the particular level.

9. The method of claim 8, wherein the one or more processors include a first processor and a second processor, wherein obtaining first and second submatrices and first and second subvectors of the particular SCI on the particular level is performed by the first processor, and obtaining first and second submatrices and first and second subvectors of the other SCI on the particular level is performed by the second processor.

10. The method of claim 9, wherein the one or more computer systems include a first computer system and a second computer system coupled to the first computer system by a network, and wherein the first processor is in the first computer system and the second processor is in a second computer system.

11. The method of claim 1, wherein the one or more processors include a third processor and a fourth processor, wherein the first and second submatrices and first and second subvectors of the first SCI are obtained by the third processor, and wherein the second submatrix and the second subvector of at least one of one or more second SCIs are obtained by the fourth processor.

12. The method of claim 11, further comprising passing the second submatrix and the second subvector of the at least one of one or more second SCIs from the fourth processor to the third processor.

13. The method of claim 11, wherein the one or more computer systems include a third computer system and a fourth computer system coupled to the third computer system by a network, and wherein the third processor is in the third computer system and the fourth processor is in a fourth computer system.

14. The method of claim 13, further comprising passing the second submatrix and the second subvector of the at least one of one or more second SCIs from the third computer system to the fourth computer system via the network.

15. The method of claim 1, wherein the one or more processors include a fifth processor and a sixth processor, and wherein receiving the netlist comprises receiving a first portion of the netlist by the fifth processor and receiving a second portion of the netlist by the sixth processor.

16. The method of claim 1, wherein the one or more processors include a seventh processor and an eighth processor, and wherein receiving the netlist comprises receiving the netlist by the seventh processor and providing at least a portion of the netlist by the seventh processor to the eighth processor.

17. The method of claim 16, wherein the one or more computer systems include a first computer system and a second computer system coupled to the first computer system by a network, wherein the first processor is in the first computer system and the second processor is in a second computer system, and wherein the at least a portion of the netlist is transmitted by the first computer system to the second computer system via the network.

18. A system to simulate a circuit, comprising:
a first processor configured to receive at least a first portion of a netlist of the circuit, the netlist including a top circuit and a plurality of sub-circuit instances (SCIs) forming a hierarchy having a first level under the top circuit and at least one second level under the first level such that each sub-circuit instance (SCI) of the plurality of SCIs is a child of another SCI at a higher level or a child of the top circuit, and that each SCI of the plurality of SCIs is either a leaf in the hierarchy or a parent of a different SCI at a lower level, each of the plurality of SCIs having external ports, at least one of the plurality of SCIs including internal nets; and
one or more second processors configured to, for each respective SCI of one or more first SCIs of the plurality of SCIs and during at least one of a series of iteration steps, obtain first and second submatrices and first and second subvectors of the respective SCI, storing the first submatrix and the first subvector of the respective SCI into one or more memory devices, and passing the second submatrix and the second subvector of the respective SCI to the first processor;
wherein the first processor is further configured to:
incorporating the second submatrix and the second subvector of each of the one or more first SCIs into a circuit equation representing electrical characteristics of a second SCI, and extracting first and second submatrices and first and second subvectors of the second SCI from the circuit equation, the second SCI being a parent of the one or more first SCI.

19. The system of claim 18, further comprising one or more third processors, wherein a processor of the first processor, the one or more second processors, and the one or more third processors is configured to determine signal values in the top circuit, the signal values including signal values at external ports of the top circuit and signal values at the external ports of the SCIs at the first level immediately below the top circuit.

20. The system of claim 18, wherein one or more processors of the first processor, the one or more second processors, and the one or more third processors are configured to:
- starting from the first level of the hierarchy, determine signal values of each specific SCI at each level of the hierarchy, wherein certain signal values of a third SCI corresponding to external signal values of a fourth SCI are passed down to the fourth SCI so that internal signal values of the fourth SCI are determined using the certain signal values of the third SCI and first submatrix and first subvector of the fourth SCI stored in the one or more memory devices, the fourth SCI being a child of the third SCI.

* * * * *